US011280637B2

(12) United States Patent
Diaconu et al.

(10) Patent No.: US 11,280,637 B2
(45) Date of Patent: Mar. 22, 2022

(54) HIGH PERFORMANCE MAGNETIC ANGLE SENSOR

(71) Applicant: Allegro MicroSystems, LLC, Manchester, NH (US)

(72) Inventors: Aurelian Diaconu, Londonderry, NH (US); Paul A. David, Bow, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 16/683,803

(22) Filed: Nov. 14, 2019

(65) Prior Publication Data

US 2021/0148731 A1 May 20, 2021

(51) Int. Cl.
    *G01D 5/14* (2006.01)
(52) U.S. Cl.
    CPC .................... *G01D 5/145* (2013.01)
(58) Field of Classification Search
    CPC ....................................... G01D 5/145
    See application file for complete search history.

(56) References Cited

U.S. PATENT DOCUMENTS

| 3,132,337 | A | 5/1964 | Martin |
| 3,195,043 | A | 7/1965 | Burig et al. |
| 3,281,628 | A | 10/1966 | Bauer et al. |
| 3,607,528 | A | 9/1971 | Gassaway |
| 3,611,138 | A | 10/1971 | Winebrener |
| 3,661,061 | A | 5/1972 | Tokarz |
| 3,728,786 | A | 4/1973 | Lucas et al. |
| 4,048,670 | A | 9/1977 | Eysermans |

(Continued)

FOREIGN PATENT DOCUMENTS

| CH | 683469 | 3/1994 |
| CN | 102323554 | 1/2012 |

(Continued)

OTHER PUBLICATIONS

Notice of Allowance dated Jun. 27, 2011; for U.S. Appl. No. 12/959,672; 8 pages.

(Continued)

*Primary Examiner* — Clayton E. LaBalle
*Assistant Examiner* — Michael A Harrison
(74) *Attorney, Agent, or Firm* — Daly, Crowley, Mofford & Durkee, LLC

(57) ABSTRACT

A sensor is disclosed for detecting an orientation of a magnet, the sensor comprising: a first sensor array including a first plurality of sensor elements that are arranged along a first line; a second sensor array including a second plurality of sensor elements that are arranged along a second line; and a processing circuitry configured to: detect a magnetic field produced by the magnet by using the first sensor array, and identify a first point on the first line where at least one component of the magnetic field has a predetermined value; detect the magnetic field by using the second sensor array, and identify a second point on the second line where at least one component of the magnetic field has the predetermined value; detect an orientation of the magnet relative to the sensor based on the first point and the second point; and output an indication of the orientation of the magnet based on the first point and the second point.

18 Claims, 10 Drawing Sheets

(56) References Cited

U.S. PATENT DOCUMENTS

| | | |
|---|---|---|
| 4,079,360 A | 3/1978 | Ookubo et al. |
| 4,180,753 A | 12/1979 | Cook, II |
| 4,188,605 A | 2/1980 | Stout |
| 4,204,317 A | 5/1980 | Winn |
| 4,236,832 A | 12/1980 | Komatsu et al. |
| 4,283,643 A | 8/1981 | Levin |
| 4,315,523 A | 2/1982 | Mahawili et al. |
| 4,438,347 A | 3/1984 | Gehring |
| 4,490,674 A | 12/1984 | Ito |
| 4,573,258 A | 3/1986 | Io et al. |
| 4,614,111 A | 9/1986 | Wolff |
| 4,649,796 A | 3/1987 | Schmidt |
| 4,668,914 A | 5/1987 | Kersten et al. |
| 4,670,715 A | 6/1987 | Fuzzell |
| 4,719,419 A | 1/1988 | Dawley |
| 4,733,455 A | 3/1988 | Nakamura et al. |
| 4,745,363 A | 5/1988 | Carr et al. |
| 4,746,859 A | 5/1988 | Malik |
| 4,752,733 A | 6/1988 | Petr et al. |
| 4,758,943 A | 7/1988 | Aström et al. |
| 4,760,285 A | 7/1988 | Nelson |
| 4,761,569 A | 8/1988 | Higgs |
| 4,764,767 A | 8/1988 | Ichikawa et al. |
| 4,769,344 A | 9/1988 | Sakai et al. |
| 4,772,929 A | 9/1988 | Manchester |
| 4,789,826 A | 12/1988 | Willett |
| 4,796,354 A | 1/1989 | Yokoyama et al. |
| 4,823,075 A | 4/1989 | Alley |
| 4,829,352 A | 5/1989 | Popovic et al. |
| 4,833,406 A | 5/1989 | Foster |
| 4,893,027 A | 1/1990 | Kammerer et al. |
| 4,908,685 A | 3/1990 | Shibasaki et al. |
| 4,910,861 A | 3/1990 | Dohogne |
| 4,935,698 A | 6/1990 | Kawaji et al. |
| 4,944,028 A | 7/1990 | Iijima et al. |
| 4,954,777 A | 9/1990 | Klopfer et al. |
| 4,970,411 A | 11/1990 | Halg et al. |
| 4,983,916 A | 1/1991 | Iijima et al. |
| 5,012,322 A | 4/1991 | Guillotte |
| 5,021,493 A | 6/1991 | Sandstrom |
| 5,028,868 A | 7/1991 | Murata et al. |
| 5,038,130 A | 8/1991 | Eck et al. |
| 5,045,920 A | 9/1991 | Vig et al. |
| 5,078,944 A | 1/1992 | Yoshino |
| 5,084,289 A | 1/1992 | Shin et al. |
| 5,121,289 A | 6/1992 | Gagliardi |
| 5,137,677 A | 8/1992 | Murata |
| 5,139,973 A | 8/1992 | Nagy et al. |
| 5,167,896 A | 12/1992 | Hirota et al. |
| 5,168,244 A | 12/1992 | Muranaka |
| 5,185,919 A | 2/1993 | Hickey |
| 5,196,794 A | 3/1993 | Murata |
| 5,200,698 A | 4/1993 | Thibaud |
| 5,210,493 A | 5/1993 | Schroeder et al. |
| 5,216,405 A | 6/1993 | Schroeder et al. |
| 5,220,207 A | 6/1993 | Kovalcik et al. |
| 5,244,834 A | 9/1993 | Suzuki et al. |
| 5,247,202 A | 9/1993 | Popovic et al. |
| 5,247,278 A | 9/1993 | Pant et al. |
| 5,250,925 A | 10/1993 | Shinkle |
| 5,286,426 A | 2/1994 | Rano, Jr. et al. |
| 5,289,344 A | 2/1994 | Gagnon et al. |
| 5,291,133 A | 3/1994 | Gokhale et al. |
| 5,304,926 A | 4/1994 | Wu |
| 5,315,245 A | 5/1994 | Schroeder et al. |
| 5,329,416 A | 7/1994 | Ushiyama et al. |
| 5,331,478 A | 7/1994 | Aranovsky |
| 5,332,956 A | 7/1994 | Oh |
| 5,332,965 A | 7/1994 | Wolf et al. |
| 5,341,097 A | 8/1994 | Wu |
| 5,351,028 A | 9/1994 | Krahn |
| 5,399,968 A | 3/1995 | Sheppard et al. |
| 5,412,255 A | 5/1995 | Wallrafen |
| 5,414,355 A | 5/1995 | Davidson et al. |
| 5,424,558 A | 6/1995 | Borden et al. |
| 5,432,444 A | 7/1995 | Yasohama et al. |
| 5,434,105 A | 7/1995 | Liou |
| 5,453,727 A | 9/1995 | Shibasaki et al. |
| 5,469,058 A | 11/1995 | Dunnam |
| 5,477,143 A | 12/1995 | Wu |
| 5,479,695 A | 1/1996 | Grader et al. |
| 5,486,759 A | 1/1996 | Seiler et al. |
| 5,488,294 A | 1/1996 | Liddell et al. |
| 5,491,633 A | 2/1996 | Henry et al. |
| 5,497,081 A | 3/1996 | Wolf et al. |
| 5,497,083 A | 3/1996 | Nakazato et al. |
| 5,500,589 A | 3/1996 | Sumcad |
| 5,500,994 A | 3/1996 | Itaya |
| 5,508,611 A | 4/1996 | Schroeder et al. |
| 5,521,501 A | 5/1996 | Dettmann et al. |
| 5,541,506 A | 7/1996 | Kawakita et al. |
| 5,545,983 A | 8/1996 | Okeya et al. |
| 5,551,146 A | 9/1996 | Kawabata et al. |
| 5,552,706 A | 9/1996 | Carr |
| 5,572,058 A | 11/1996 | Biard |
| 5,581,170 A | 12/1996 | Mammano et al. |
| 5,581,179 A | 12/1996 | Engel et al. |
| 5,583,436 A | 12/1996 | Van De Walle et al. |
| 5,585,574 A | 12/1996 | Sugihara et al. |
| 5,596,272 A | 1/1997 | Busch |
| 5,612,618 A | 3/1997 | Arakawa |
| 5,619,137 A | 4/1997 | Vig et al. |
| 5,621,319 A | 4/1997 | Bilotti et al. |
| 5,627,315 A | 5/1997 | Figi et al. |
| 5,631,557 A | 5/1997 | Davidson |
| 5,640,090 A | 6/1997 | Furuya et al. |
| 5,657,189 A | 8/1997 | Sandhu |
| 5,691,637 A | 11/1997 | Oswald et al. |
| 5,694,038 A | 12/1997 | Moody et al. |
| 5,696,790 A | 12/1997 | Graham et al. |
| 5,712,562 A | 1/1998 | Berg |
| 5,714,102 A | 2/1998 | Highum et al. |
| 5,719,496 A | 2/1998 | Wolf |
| 5,729,128 A | 3/1998 | Bunyer et al. |
| 5,757,181 A | 5/1998 | Wolf et al. |
| 5,781,005 A | 7/1998 | Vig et al. |
| 5,789,658 A | 8/1998 | Henn et al. |
| 5,789,915 A | 8/1998 | Ingraham |
| 5,796,249 A | 8/1998 | Andräet et al. |
| 5,818,222 A | 10/1998 | Ramsden |
| 5,818,223 A | 10/1998 | Wolf |
| 5,831,513 A | 11/1998 | Lue |
| 5,839,185 A | 11/1998 | Smith et al. |
| 5,841,276 A | 11/1998 | Makino et al. |
| 5,844,411 A | 12/1998 | Vogt |
| 5,859,387 A | 1/1999 | Gagnon |
| 5,886,070 A | 2/1999 | Honkura et al. |
| 5,883,567 A | 3/1999 | Mullins, Jr. |
| 5,912,556 A | 6/1999 | Frazee et al. |
| 5,942,895 A | 8/1999 | Popovic et al. |
| 5,963,028 A | 10/1999 | Engel et al. |
| 6,011,770 A | 1/2000 | Tan |
| 6,016,055 A | 1/2000 | Jager et al. |
| 6,043,644 A | 3/2000 | de Coulon et al. |
| 6,043,646 A | 3/2000 | Jansseune |
| 6,064,199 A | 5/2000 | Walter et al. |
| 6,064,202 A | 5/2000 | Steiner et al. |
| 6,091,239 A | 7/2000 | Vig et al. |
| 6,100,680 A | 8/2000 | Vig et al. |
| 6,100,754 A | 8/2000 | Kim et al. |
| 6,136,250 A | 10/2000 | Brown |
| 6,166,535 A | 12/2000 | Irle et al. |
| 6,169,396 B1 | 1/2001 | Yokotani et al. |
| 6,175,232 B1 | 1/2001 | De Coulon et al. |
| 6,175,233 B1 | 1/2001 | McCurley et al. |
| 6,180,041 B1 | 1/2001 | Takizawa |
| 6,181,036 B1 | 1/2001 | Kazama et al. |
| 6,184,679 B1 | 2/2001 | Popovic et al. |
| 6,194,893 B1 | 2/2001 | Yokotani et al. |
| 6,198,373 B1 | 3/2001 | Ogawa et al. |
| 6,232,768 B1 | 5/2001 | Moody et al. |
| 6,236,199 B1 | 5/2001 | Irle et al. |
| 6,242,604 B1 | 6/2001 | Hudlicky et al. |
| 6,242,904 B1 | 6/2001 | Shirai et al. |

(56) References Cited

U.S. PATENT DOCUMENTS

| | | |
|---|---|---|
| 6,242,905 B1 | 6/2001 | Draxelmayr |
| 6,265,864 B1 | 7/2001 | De Winter et al. |
| 6,265,865 B1 | 7/2001 | Engel et al. |
| 6,278,269 B1 | 8/2001 | Vig et al. |
| 6,288,533 B1 | 9/2001 | Haeberli et al. |
| 6,291,989 B1 | 9/2001 | Schroeder |
| 6,297,627 B1 | 10/2001 | Towne et al. |
| 6,297,628 B1 | 10/2001 | Bicking et al. |
| 6,323,642 B1 | 11/2001 | Nishimura et al. |
| 6,339,322 B1 | 1/2002 | Loreck et al. |
| 6,351,506 B1 | 2/2002 | Lewicki |
| 6,356,068 B1 | 3/2002 | Steiner et al. |
| 6,356,741 B1 | 3/2002 | Bilotti et al. |
| 6,366,079 B1 | 4/2002 | Uenoyama |
| 6,392,478 B1 | 5/2002 | Mulder et al. |
| 6,429,640 B1 | 8/2002 | Daughton et al. |
| 6,436,748 B1 | 8/2002 | Forbes et al. |
| 6,437,558 B2 | 8/2002 | Li et al. |
| 6,452,381 B1 | 9/2002 | Nakatani et al. |
| 6,462,536 B1 | 10/2002 | Mednikov et al. |
| 6,492,804 B2 | 12/2002 | Tsuge et al. |
| 6,501,270 B1 | 12/2002 | Opie |
| 6,504,363 B1 | 1/2003 | Dogaru et al. |
| 6,522,131 B1 | 2/2003 | Hiligsmann et al. |
| 6,525,531 B2 | 2/2003 | Forrest et al. |
| 6,528,992 B2 | 3/2003 | Shinjo et al. |
| 6,542,068 B1 | 4/2003 | Drapp et al. |
| 6,542,847 B1 | 4/2003 | Lohberg et al. |
| 6,545,332 B2 | 4/2003 | Huang |
| 6,545,457 B2 | 4/2003 | Goto et al. |
| 6,545,462 B2 | 4/2003 | Schott et al. |
| 6,566,862 B1 | 5/2003 | Goto et al. |
| 6,566,872 B1 | 5/2003 | Sugitani |
| 6,590,804 B1 | 7/2003 | Perner |
| 6,622,012 B2 | 9/2003 | Bilotti et al. |
| 6,640,451 B1 | 11/2003 | Vinarcik |
| 6,653,968 B1 | 11/2003 | Schneider |
| 6,674,679 B1 | 1/2004 | Perner et al. |
| 6,687,644 B1 | 2/2004 | Zinke et al. |
| 6,692,676 B1 | 2/2004 | Vig et al. |
| 6,759,843 B2 | 7/2004 | Furlong |
| 6,768,301 B1 | 7/2004 | Hohe et al. |
| 6,770,163 B1 | 8/2004 | Kuah et al. |
| 6,781,233 B2 | 8/2004 | Zverev et al. |
| 6,781,359 B2 | 8/2004 | Stauth et al. |
| 6,798,193 B2 | 9/2004 | Zimmerman et al. |
| 6,815,944 B2 | 11/2004 | Vig et al. |
| 6,822,443 B1 | 11/2004 | Dogaru |
| 6,853,178 B2 | 2/2005 | Hayat-Dawoodi |
| 6,896,407 B2 | 5/2005 | Nomiyama et al. |
| 6,902,951 B2 | 6/2005 | Goller et al. |
| 6,917,321 B1 | 7/2005 | Haurie et al. |
| 6,969,988 B2 | 11/2005 | Kakuta et al. |
| 7,023,205 B1 | 4/2006 | Krupp |
| 7,026,808 B2 | 4/2006 | Vig et al. |
| 7,030,606 B2 | 4/2006 | Kato et al. |
| 7,031,170 B2 | 4/2006 | Daeche et al. |
| 7,038,448 B2 | 5/2006 | Schott et al. |
| 7,049,924 B2 | 5/2006 | Hayashi et al. |
| 7,085,119 B2 | 8/2006 | Bilotti et al. |
| 7,112,955 B2 | 9/2006 | Buchhold |
| 7,112,957 B2 | 9/2006 | Bicking |
| 7,119,538 B2 | 10/2006 | Blossfeld |
| 7,126,327 B1 | 10/2006 | Busch |
| 7,132,825 B2 | 11/2006 | Martin |
| 7,159,556 B2 | 1/2007 | Yoshihara |
| 7,184,876 B2 | 2/2007 | Tuelings et al. |
| 7,190,784 B2 | 3/2007 | Li |
| 7,193,412 B2 | 3/2007 | Freeman |
| 7,199,579 B2 | 4/2007 | Scheller et al. |
| 7,235,968 B2 | 6/2007 | Popovic et al. |
| 7,250,760 B2 | 7/2007 | Ao |
| 7,259,545 B2 | 8/2007 | Stauth et al. |
| 7,259,556 B2 | 8/2007 | Popovic et al. |
| 7,265,531 B2 | 9/2007 | Stauth et al. |
| 7,269,992 B2 | 9/2007 | Lamb et al. |
| 7,285,952 B1 | 10/2007 | Hatanaka et al. |
| 7,292,095 B2 | 11/2007 | Burt et al. |
| 7,295,000 B2 | 11/2007 | Werth |
| 7,307,824 B2 | 12/2007 | Bilotti et al. |
| 7,319,319 B2 | 1/2008 | Jones et al. |
| 7,323,780 B2 | 1/2008 | Daubenspeck et al. |
| 7,323,870 B2 | 1/2008 | Tatschl et al. |
| 7,325,175 B2 | 1/2008 | Momtaz |
| 7,345,468 B2 | 3/2008 | Okada et al. |
| 7,355,388 B2 | 4/2008 | Ishio |
| 7,361,531 B2 | 4/2008 | Sharma et al. |
| 7,362,094 B2 | 4/2008 | Voisine et al. |
| 7,365,530 B2 | 4/2008 | Bailey et al. |
| 7,385,394 B2 | 6/2008 | Auburger et al. |
| 7,425,821 B2 | 9/2008 | Monreal et al. |
| 7,474,093 B2 | 1/2009 | Ausserlechner |
| 7,476,953 B2 | 1/2009 | Taylor et al. |
| 7,518,354 B2 | 4/2009 | Stauth et al. |
| 7,592,801 B2 | 9/2009 | Bailey et al. |
| 7,598,601 B2 | 10/2009 | Taylor et al. |
| 7,605,647 B1 | 10/2009 | Romero et al. |
| 7,635,993 B2 | 12/2009 | Boeve |
| 7,694,200 B2 | 4/2010 | Forrest et al. |
| 7,701,208 B2 | 4/2010 | Nishikawa |
| 7,714,570 B2 | 5/2010 | Thomas et al. |
| 7,729,675 B2 | 6/2010 | Krone |
| 7,746,056 B2 | 6/2010 | Stauth et al. |
| 7,746,065 B2 | 6/2010 | Pastre et al. |
| 7,759,929 B2 | 7/2010 | Forsyth |
| 7,764,118 B2 | 7/2010 | Kusuda et al. |
| 7,768,083 B2 | 8/2010 | Doogue et al. |
| 7,769,110 B2 | 8/2010 | Momtaz |
| 7,772,838 B2 | 8/2010 | Bailey et al. |
| 7,800,389 B2 | 9/2010 | Friedrich et al. |
| 7,808,074 B2 | 10/2010 | Knittl |
| 7,816,772 B2 | 10/2010 | Engel et al. |
| 7,816,905 B2 | 10/2010 | Doogue et al. |
| 7,839,141 B2 | 11/2010 | Werth et al. |
| 7,872,322 B2 | 1/2011 | Schott et al. |
| 7,911,203 B2 | 3/2011 | Thomas et al. |
| 7,915,886 B2 | 3/2011 | Stolfus et al. |
| 7,923,996 B2 | 4/2011 | Doogue et al. |
| 7,936,144 B2 | 5/2011 | Vig et al. |
| 7,956,604 B2 | 6/2011 | Ausserlechner |
| 7,961,823 B2 | 6/2011 | Kolze et al. |
| 7,965,076 B2 | 6/2011 | Schott |
| 7,990,209 B2 | 8/2011 | Romero |
| 7,994,774 B2 | 8/2011 | Thomas et al. |
| 8,030,918 B2 | 10/2011 | Doogue et al. |
| 8,058,870 B2 | 11/2011 | Sterling |
| 8,063,631 B2 | 11/2011 | Fermon et al. |
| 8,063,634 B2 | 11/2011 | Sauber et al. |
| 8,080,993 B2 | 12/2011 | Theuss et al. |
| 8,089,276 B2 | 1/2012 | Kentsch |
| 8,106,649 B2 | 1/2012 | Kaita et al. |
| 8,106,654 B2 | 1/2012 | Theuss et al. |
| 8,128,549 B2 | 3/2012 | Testani et al. |
| 8,134,358 B2 | 3/2012 | Charlier et al. |
| 8,143,169 B2 | 3/2012 | Engel et al. |
| 8,253,210 B2 | 8/2012 | Theuss et al. |
| 8,274,279 B2 | 9/2012 | Gies |
| 8,362,579 B2 | 1/2013 | Theuss et al. |
| 8,542,010 B2 | 9/2013 | Cesaretti et al. |
| 8,559,139 B2 | 10/2013 | Theuss |
| 8,577,634 B2 | 11/2013 | Donovan et al. |
| 8,610,430 B2 | 12/2013 | Werth et al. |
| 8,624,588 B2 | 1/2014 | Vig et al. |
| 8,629,539 B2 | 1/2014 | Milano et al. |
| 8,680,846 B2 | 3/2014 | Cesaretti et al. |
| 8,723,512 B1 | 5/2014 | Burdette et al. |
| 8,754,640 B2 | 6/2014 | Vig et al. |
| 8,773,124 B2 | 7/2014 | Ausserlechner |
| 8,860,404 B2 | 10/2014 | Dwyer et al. |
| 9,081,041 B2 | 7/2015 | Friedrich et al. |
| 9,116,018 B2 | 8/2015 | Frachon |
| 9,164,156 B2 | 10/2015 | Elian et al. |
| 9,201,122 B2 | 12/2015 | Cesaretti et al. |
| 9,201,123 B2 | 12/2015 | Elian et al. |

(56) References Cited

U.S. PATENT DOCUMENTS

| | | |
|---|---|---|
| 9,347,799 B2 | 5/2016 | Nazarian et al. |
| 9,411,025 B2 | 8/2016 | David et al. |
| 9,719,806 B2 | 8/2017 | Foletto et al. |
| 9,720,054 B2 | 8/2017 | Drouin et al. |
| 9,810,519 B2 | 11/2017 | Taylor et al. |
| 9,823,090 B2 | 11/2017 | Foletto et al. |
| 9,823,092 B2 | 11/2017 | David et al. |
| 10,041,810 B2 | 8/2018 | Vig et al. |
| 10,234,513 B2 | 3/2019 | Vig et al. |
| 10,408,892 B2 | 9/2019 | David et al. |
| 2001/0002791 A1 | 6/2001 | Tsuge et al. |
| 2001/0009367 A1 | 7/2001 | Seitzer et al. |
| 2001/0026153 A1 | 10/2001 | Nakamura et al. |
| 2002/0027488 A1 | 3/2002 | Hayat-Dawoodi et al. |
| 2002/0084923 A1 | 7/2002 | Li |
| 2002/0097639 A1 | 7/2002 | Ishizaki et al. |
| 2003/0001563 A1 | 1/2003 | Turner |
| 2003/0038675 A1 | 2/2003 | Gailus et al. |
| 2003/0062891 A1 | 4/2003 | Slates |
| 2003/0102909 A1 | 6/2003 | Motz |
| 2003/0107366 A1 | 6/2003 | Busch et al. |
| 2003/0151406 A1 | 8/2003 | Wan et al. |
| 2003/0173955 A1 | 9/2003 | Uenoyama |
| 2003/0222642 A1 | 12/2003 | Butzmann |
| 2003/0227286 A1 | 12/2003 | Dunisch et al. |
| 2004/0032251 A1 | 2/2004 | Zimmerman et al. |
| 2004/0046248 A1 | 3/2004 | Waelti et al. |
| 2004/0056647 A1 | 3/2004 | Stauth et al. |
| 2004/0062362 A1 | 4/2004 | Matsuya |
| 2004/0080314 A1 | 4/2004 | Tsujii et al. |
| 2004/0135220 A1 | 7/2004 | Goto |
| 2004/0170052 A1 | 9/2004 | Inui |
| 2004/0174164 A1 | 9/2004 | Ao |
| 2004/0184196 A1 | 9/2004 | Jayasekara |
| 2004/0189285 A1 | 9/2004 | Uenoyama |
| 2004/0196045 A1 | 10/2004 | Larsen |
| 2004/0252563 A1 | 12/2004 | Hokuto et al. |
| 2004/0263014 A1 | 12/2004 | Miya |
| 2005/0017709 A1 | 1/2005 | Stolfus et al. |
| 2005/0120782 A1 | 6/2005 | Kishibata et al. |
| 2005/0122095 A1 | 6/2005 | Dooley |
| 2005/0122099 A1 | 6/2005 | Imamoto et al. |
| 2005/0167790 A1 | 8/2005 | Khor et al. |
| 2005/0179429 A1 | 8/2005 | Lohberg |
| 2005/0225318 A1 | 10/2005 | Bailey et al. |
| 2005/0280411 A1 | 12/2005 | Bicking |
| 2006/0011999 A1 | 1/2006 | Schott et al. |
| 2006/0028204 A1 | 2/2006 | Oohira |
| 2006/0033487 A1 | 2/2006 | Nagano et al. |
| 2006/0038559 A1 | 2/2006 | Lamb et al. |
| 2006/0038561 A1 | 2/2006 | Honkura et al. |
| 2006/0068237 A1 | 3/2006 | Murphy |
| 2006/0097715 A1 | 5/2006 | Oohira et al. |
| 2006/0097717 A1 | 5/2006 | Tokuhara et al. |
| 2006/0125473 A1 | 6/2006 | Frachon et al. |
| 2006/0175674 A1 | 8/2006 | Taylor |
| 2006/0181263 A1 | 8/2006 | Doogue et al. |
| 2006/0202692 A1 | 9/2006 | Tatschl et al. |
| 2006/0238190 A1 | 10/2006 | Ishio |
| 2006/0261801 A1 | 11/2006 | Busch |
| 2007/0110199 A1 | 5/2007 | Momtaz et al. |
| 2007/0170533 A1 | 7/2007 | Doogue et al. |
| 2007/0247141 A1 | 10/2007 | Pastre et al. |
| 2007/0285089 A1 | 12/2007 | Ibuki et al. |
| 2007/0290682 A1 | 12/2007 | Oohira et al. |
| 2008/0012558 A1 | 1/2008 | Rossler et al. |
| 2008/0013298 A1 | 1/2008 | Sharma et al. |
| 2008/0094055 A1 | 4/2008 | Monreal et al. |
| 2008/0116884 A1 | 5/2008 | Rettig et al. |
| 2008/0116885 A1 | 5/2008 | Van Zon et al. |
| 2008/0137784 A1 | 6/2008 | Krone |
| 2008/0237818 A1 | 10/2008 | Engel et al. |
| 2008/0238410 A1 | 10/2008 | Charlier et al. |
| 2009/0001964 A1 | 1/2009 | Strzalkowski |
| 2009/0001965 A1 | 1/2009 | Ausserlechner et al. |
| 2009/0001972 A1 | 1/2009 | Fernandez et al. |
| 2009/0009163 A1 | 1/2009 | Yamada |
| 2009/0058404 A1 | 3/2009 | Kurumado |
| 2009/0085706 A1 | 4/2009 | Baarman et al. |
| 2009/0102467 A1 | 4/2009 | Snell et al. |
| 2009/0121707 A1 | 5/2009 | Schott |
| 2009/0137398 A1 | 5/2009 | Bozovic et al. |
| 2009/0140725 A1 | 6/2009 | Ausserlechner |
| 2009/0146647 A1 | 6/2009 | Ausserlechner |
| 2009/0152696 A1 | 6/2009 | Dimasacat et al. |
| 2009/0167298 A1 | 7/2009 | Kreutzbruck et al. |
| 2009/0167301 A1 | 7/2009 | Ausserlechner |
| 2009/0168286 A1 | 7/2009 | Berkley et al. |
| 2009/0174395 A1 | 7/2009 | Thomas et al. |
| 2009/0189600 A1 | 7/2009 | Kurkovskiy |
| 2009/0206827 A1 | 8/2009 | Aimuta et al. |
| 2009/0206831 A1 | 8/2009 | Fermon et al. |
| 2009/0212765 A1 | 8/2009 | Doogue et al. |
| 2009/0243601 A1 | 10/2009 | Feldtkeller |
| 2009/0251134 A1 | 10/2009 | Uenoyama |
| 2009/0256552 A1 | 10/2009 | Guo et al. |
| 2009/0262466 A1 | 10/2009 | Kurata et al. |
| 2009/0315543 A1 | 12/2009 | Guo et al. |
| 2009/0322325 A1 | 12/2009 | Ausserlechner |
| 2009/0326860 A1 | 12/2009 | Hainz et al. |
| 2010/0026279 A1 | 2/2010 | Vig et al. |
| 2010/0026288 A1 | 2/2010 | Sauber et al. |
| 2010/0033175 A1 | 2/2010 | Boeve et al. |
| 2010/0045268 A1 | 2/2010 | Kilian |
| 2010/0052667 A1 | 3/2010 | Kohama et al. |
| 2010/0072988 A1 | 3/2010 | Hammerschmidt et al. |
| 2010/0141249 A1 | 6/2010 | Ararao et al. |
| 2010/0156397 A1 | 6/2010 | Yabusaki et al. |
| 2010/0164491 A1 | 7/2010 | Kejik et al. |
| 2010/0188078 A1 | 7/2010 | Foletto et al. |
| 2010/0201356 A1 | 8/2010 | Koller et al. |
| 2010/0211347 A1 | 8/2010 | Friedrich et al. |
| 2010/0237450 A1 | 9/2010 | Doogue et al. |
| 2010/0276769 A1 | 11/2010 | Theuss et al. |
| 2010/0295140 A1 | 11/2010 | Theuss et al. |
| 2010/0330708 A1 | 12/2010 | Engel et al. |
| 2011/0004278 A1 | 1/2011 | Aghassian et al. |
| 2011/0018533 A1 | 1/2011 | Cesaretti et al. |
| 2011/0031960 A1 | 2/2011 | Hohe et al. |
| 2011/0048102 A1 | 3/2011 | Fernandez et al. |
| 2011/0074405 A1 | 3/2011 | Doogue et al. |
| 2011/0127998 A1 | 6/2011 | Elian et al. |
| 2011/0175605 A1 | 7/2011 | Kim et al. |
| 2011/0224537 A1 | 9/2011 | Brunner |
| 2011/0248708 A1 | 10/2011 | Thomas et al. |
| 2011/0267040 A1 | 11/2011 | Frachon |
| 2011/0285384 A1 | 11/2011 | Nomura |
| 2011/0291650 A1 | 12/2011 | Franke et al. |
| 2011/0298448 A1 | 12/2011 | Foletto et al. |
| 2012/0007589 A1 | 1/2012 | Okada |
| 2012/0013333 A1 | 1/2012 | Ararao et al. |
| 2012/0019236 A1 | 1/2012 | Tiernan et al. |
| 2012/0062215 A1 | 3/2012 | Ide et al. |
| 2012/0086090 A1 | 4/2012 | Sharma et al. |
| 2012/0200290 A1 | 8/2012 | Ausserlechner |
| 2012/0249133 A1 | 10/2012 | Friedrich |
| 2012/0274314 A1 | 11/2012 | Cesaretti et al. |
| 2012/0293167 A1 | 11/2012 | Kitanaka et al. |
| 2012/0303305 A1 | 11/2012 | Bergqvist et al. |
| 2013/0015845 A1 | 1/2013 | Fox |
| 2013/0057257 A1 | 3/2013 | Friedrich et al. |
| 2013/0113474 A1 | 5/2013 | Elian |
| 2013/0214774 A1 | 8/2013 | Cesaretti et al. |
| 2013/0238278 A1 | 9/2013 | Shoemaker et al. |
| 2013/0241543 A1 | 9/2013 | Stenson et al. |
| 2013/0249546 A1 | 9/2013 | David et al. |
| 2013/0265037 A1 | 10/2013 | Friedrich et al. |
| 2013/0278246 A1 | 10/2013 | Stegerer et al. |
| 2013/0300401 A1 | 11/2013 | Krapf et al. |
| 2013/0320970 A1 | 12/2013 | Foletto et al. |
| 2013/0335069 A1 | 12/2013 | Vig et al. |
| 2014/0084906 A1 | 3/2014 | Ruigrok et al. |
| 2014/0175584 A1 | 6/2014 | Foletto et al. |
| 2014/0176126 A1 | 6/2014 | Friedrich et al. |

(56) References Cited

U.S. PATENT DOCUMENTS

| | | |
|---|---|---|
| 2014/0232379 A1 | 8/2014 | Nazarian et al. |
| 2014/0266176 A1 | 9/2014 | Fernandez et al. |
| 2014/0266181 A1 | 9/2014 | Milano et al. |
| 2014/0305761 A1 | 10/2014 | Kimes |
| 2014/0327435 A1 | 11/2014 | Röhrer |
| 2014/0347044 A1 | 11/2014 | Monreal et al. |
| 2015/0022186 A1 | 1/2015 | Ausserlechner |
| 2015/0022187 A1 | 1/2015 | Taylor et al. |
| 2015/0022193 A1 | 1/2015 | Burdette et al. |
| 2015/0022197 A1 | 1/2015 | David et al. |
| 2015/0022198 A1 | 1/2015 | David et al. |
| 2015/0211895 A1 | 7/2015 | Reitsma et al. |
| 2015/0256328 A1 | 9/2015 | Kamatani |
| 2015/0292907 A1 | 10/2015 | Kawase |
| 2015/0346289 A1 | 12/2015 | Ausserlechner |
| 2015/0377648 A1 | 12/2015 | Sirohiwala et al. |
| 2016/0025820 A1 | 1/2016 | Scheller et al. |
| 2016/0069662 A1 | 3/2016 | Mullenix et al. |
| 2016/0123774 A1 | 5/2016 | Foletto et al. |
| 2017/0271399 A1 | 9/2017 | Lee et al. |
| 2017/0285117 A1 | 10/2017 | Drouin et al. |
| 2017/0307696 A1 | 10/2017 | Werth et al. |
| 2017/0314907 A1 | 11/2017 | Taylor et al. |
| 2017/0328739 A1 | 11/2017 | David et al. |
| 2017/0356760 A1 | 12/2017 | David et al. |
| 2018/0011150 A1 | 1/2018 | Pepka et al. |
| 2018/0172423 A1* | 6/2018 | Ausserlechner ....... G01B 7/003 |
| 2018/0340911 A1 | 11/2018 | Romero et al. |
| 2018/0340986 A1 | 11/2018 | Latham et al. |
| 2018/0340988 A1 | 11/2018 | Latham et al. |
| 2018/0340989 A1 | 11/2018 | Latham et al. |
| 2019/0018080 A1 | 1/2019 | Marauska et al. |
| 2019/0033096 A1 | 1/2019 | David et al. |
| 2019/0162784 A1 | 5/2019 | Lassalle-Balier et al. |

FOREIGN PATENT DOCUMENTS

| | | |
|---|---|---|
| CN | 102483443 | 5/2012 |
| CN | 102713654 | 10/2012 |
| CN | 102954808 | 3/2013 |
| DE | 2518054 | 11/1976 |
| DE | 4031560 | 4/1992 |
| DE | 19539458 | 4/1997 |
| DE | 68927973 T2 | 9/1997 |
| DE | 19634715 | 3/1998 |
| DE | 19650935 | 6/1998 |
| DE | 19838433 | 3/1999 |
| DE | 19851839 | 11/1999 |
| DE | 19961504 | 6/2001 |
| DE | 10210184 | 9/2003 |
| DE | 10314602 | 10/2004 |
| DE | 102005014509 | 10/2006 |
| DE | 102006037226 | 2/2008 |
| DE | 102007018238 | 10/2008 |
| DE | 102007041230 | 4/2009 |
| DE | 102010016584 | 11/2010 |
| DE | 102011102483 | 11/2012 |
| EP | 0146091 | 6/1985 |
| EP | 0289414 A2 | 2/1988 |
| EP | 0289414 A3 | 2/1988 |
| EP | 0357013 A2 | 3/1990 |
| EP | 0357013 A3 | 3/1990 |
| EP | 0361456 A2 | 4/1990 |
| EP | 0361456 A3 | 4/1990 |
| EP | 0504583 | 9/1992 |
| EP | 0629834 A1 | 12/1994 |
| EP | 0631416 B1 | 12/1994 |
| EP | 0680103 A1 | 11/1995 |
| EP | 0875733 A2 | 11/1998 |
| EP | 0944888 B1 | 9/1999 |
| EP | 1306687 A2 | 5/2003 |
| EP | 1443332 A1 | 8/2004 |
| EP | 0898180 B1 | 11/2004 |
| EP | 1580560 A1 | 9/2005 |
| EP | 1637898 A1 | 3/2006 |
| EP | 1662353 A1 | 5/2006 |
| EP | 1679524 A1 | 7/2006 |
| EP | 1850143 A1 | 10/2007 |
| EP | 2000814 | 12/2008 |
| EP | 2063229 | 5/2009 |
| EP | 2402719 | 1/2012 |
| EP | 2466265 A2 | 6/2012 |
| EP | 2730893 | 5/2014 |
| EP | 3410075 A1 | 5/2017 |
| FR | 2748105 | 10/1997 |
| FR | 2909756 | 6/2008 |
| GB | 2135060 | 8/1984 |
| GB | 2276727 | 10/1994 |
| GB | 2481482 | 12/2011 |
| JP | 6148777 | 3/1986 |
| JP | S 6367583 | 3/1988 |
| JP | 363084176 A | 4/1988 |
| JP | 63263782 | 10/1988 |
| JP | 63300911 | 12/1988 |
| JP | H 02116753 | 5/1990 |
| JP | H 02149013 | 6/1990 |
| JP | H 0329817 | 2/1991 |
| JP | H 04095817 | 3/1992 |
| JP | 04152688 | 5/1992 |
| JP | H 06273437 | 9/1994 |
| JP | 0897486 | 4/1996 |
| JP | H 08511348 | 11/1996 |
| JP | 09166612 | 6/1997 |
| JP | 1038988 | 2/1998 |
| JP | 10332725 | 12/1998 |
| JP | H 10318784 | 12/1998 |
| JP | 1174142 | 3/1999 |
| JP | 11064363 | 3/1999 |
| JP | H 11287669 | 10/1999 |
| JP | 2000-183241 | 6/2000 |
| JP | 2001-043475 | 2/2001 |
| JP | 2001-141738 | 5/2001 |
| JP | 2001-153683 | 6/2001 |
| JP | 2001-165702 | 6/2001 |
| JP | 2001-1659951 | 6/2001 |
| JP | 2002-117500 | 4/2002 |
| JP | 2002-149013 | 5/2002 |
| JP | 2002-357920 | 12/2002 |
| JP | 2003-042709 | 2/2003 |
| JP | 2003-177171 | 6/2003 |
| JP | 2003-202365 A | 7/2003 |
| JP | 2004-055932 | 2/2004 |
| JP | 2004-093381 | 3/2004 |
| JP | 2004-152688 | 5/2004 |
| JP | 2004-356338 | 12/2004 |
| JP | 2004-357858 | 12/2004 |
| JP | 2005-517928 | 6/2005 |
| JP | 2005-241269 | 9/2005 |
| JP | 2005-337866 | 12/2005 |
| JP | 2005-345302 | 12/2005 |
| JP | 2006-003096 | 1/2006 |
| JP | 2006-3116 A | 1/2006 |
| JP | 2006/098059 | 4/2006 |
| JP | 2006098059 | 4/2006 |
| JP | 2006-275764 | 10/2006 |
| JP | 2007-012582 A | 1/2007 |
| JP | 2007-218799 | 8/2007 |
| JP | 2007-240202 | 9/2007 |
| JP | 2008-180550 | 8/2008 |
| JP | 2008-286667 A | 11/2008 |
| JP | 2009-002911 A | 1/2009 |
| JP | 2009-150732 | 7/2009 |
| JP | 2009-222524 | 10/2009 |
| JP | 2009-250725 A | 10/2009 |
| JP | 2009-250931 A | 10/2009 |
| JP | 2010-014607 | 1/2010 |
| JP | 2010-078366 | 4/2010 |
| JP | 2012-501446 A | 1/2012 |
| WO | WO 88/09026 | 11/1988 |
| WO | WO 93/012403 | 6/1993 |
| WO | WO 94/08203 | 4/1994 |
| WO | WO 94/29672 | 12/1994 |
| WO | WO 95/18982 | 7/1995 |
| WO | WO 96/02849 | 2/1996 |

(56) References Cited

FOREIGN PATENT DOCUMENTS

| WO | WO 98/010302 | 3/1998 |
|---|---|---|
| WO | WO 9854547 | 12/1998 |
| WO | WO 99/49322 | 9/1999 |
| WO | WO 00/002266 | 1/2000 |
| WO | WO 01/74139 A2 | 10/2001 |
| WO | WO 01/74139 A3 | 10/2001 |
| WO | WO 03/036732 | 5/2003 |
| WO | WO 03/069358 A2 | 8/2003 |
| WO | WO 03/069358 A3 | 8/2003 |
| WO | WO 03/107018 | 12/2003 |
| WO | WO 2004/025742 | 3/2004 |
| WO | WO 2004/027436 | 4/2004 |
| WO | WO 2004/072672 | 8/2004 |
| WO | WO 2005/013363 | 2/2005 |
| WO | WO 2006/056829 | 6/2006 |
| WO | WO 2006/074989 | 7/2006 |
| WO | WO 2006/083479 | 8/2006 |
| WO | WO 2007/033168 A1 | 3/2007 |
| WO | WO 2007/095971 | 8/2007 |
| WO | WO 2007/138508 | 12/2007 |
| WO | WO 2008/008140 A2 | 1/2008 |
| WO | WO 2008/008140 A3 | 1/2008 |
| WO | WO 2008/048379 | 4/2008 |
| WO | WO 2008/121443 | 10/2008 |
| WO | WO 2008 145662 | 12/2008 |
| WO | WO 2009030361 | 3/2009 |
| WO | WO 2009/108422 A2 | 9/2009 |
| WO | WO 2009/108422 A3 | 9/2009 |
| WO | WO 2009/124969 | 10/2009 |
| WO | WO 2010/014309 | 2/2010 |
| WO | WO 2010/027658 | 3/2010 |
| WO | WO 2010/065315 | 6/2010 |
| WO | WO 2010/096367 | 8/2010 |
| WO | WO 2011/011479 | 1/2011 |
| WO | WO 2012/148646 | 11/2012 |
| WO | WO 2013/169455 | 11/2013 |
| WO | WO 2015/009532 A1 | 1/2015 |
| WO | WO 2015/058733 A1 | 4/2015 |

OTHER PUBLICATIONS

Request for Continued Examination dated Jul. 13, 2011; for U.S. Appl. No. 12/959,672; 2 pages.
Notice of Allowance dated Jul. 19, 2011; for U.S. Appl. No. 12/959,672; 8 pages.
Office Action dated May 12, 2011; for U.S. Appl. No. 12/183,367; 17 pages.
Response to Office Action filed on Aug. 10, 2011; for U.S. Appl. No. 12/183,367; 13 pages.
Office Action dated Oct. 20, 2011; for U.S. Appl. No. 12/183,367; 9 pages.
Response to Office Action filed on Jan. 17, 2012; for U.S. Appl. No. 12/183,367; 15 pages.
Office Action/Restriction Requirement dated Apr. 12, 2012; for U.S. Appl. No. 12/183,367; 6 pages.
Response to Restriction Requirement filed on May 9, 2012; for U.S. Appl. No. 12/183,367; 2 pages.
Supplemental Response to Office Action/Restriction Requirement filed on Feb. 11, 2013; for U.S. Appl. No. 12/183,367;2 pages.
Final Office Action dated May 2, 2013; for U.S. Appl. No. 12/183,367; 15 pages.
Response to Final Office Action filed on Jun. 19, 2013; for U.S. Appl. No. 12/183,367; 8 pages.
Final Office Action dated Jul. 1, 2013; for U.S. Appl. No. 12/183,367; 7 pages.
Final Office Action dated Jul. 23, 2013; for U.S. Appl. No. 12/183,367; 8 pages.
Response to Office Action filed on Aug. 27, 2013; for U.S. Appl. No. 12/183,367; 13 pages.
Notice of Allowance dated Sep. 6, 2013; for U.S. Appl. No. 12/183,367; 7 pages.
Office Action/Restriction Requirement dated Oct. 23, 2009; for U.S. Appl. No. 12/328,798; 7 pages.
Response to Office Action/Restriction Requirement filed on Nov. 4, 2009; for U.S. Appl. No. 12/328,798; 1 page.
Office Action dated Dec. 14, 2009; for U.S. Appl. No. 12/328,798; 15 pages.
Response to Office Action filed on Jan. 28, 2010; for U.S. Appl. No. 12/328,798; 22 pages.
Final Office Action dated May 24, 2010; for U.S. Appl. No. 12/328,798; 20 pages.
Response to Final Office Action filed Jul. 21, 2010 for U.S. Appl. No. 12/328,798; 23 pages.
Office Action dated Oct. 31, 2011; for U.S. Appl. No. 12/328,798; 12 pages.
Response to Office Action filed on Feb. 28, 2012; for U.S. Appl. No. 12/328,798; 15 pages.
Final Office Action dated May 10, 2012; for U.S. Appl. No. 12/328,798; 13 pages.
Response to Final Office Action filed on Oct. 9, 2012; for U.S. Appl. No. 12/328,798; 6 pages.
Notice of Allowance dated Oct. 26, 2012; for U.S. Appl. No. 12/328,798; 13 pages.
Request for Continued Examination filed on Jan. 24, 2013; for U.S. Appl. No. 12/328,798; 2 pages.
Notice of Allowance dated Mar. 1, 2013; for U.S. Appl. No. 12/328,798; 10 pages.
Office Action dated Feb. 22, 2012; for U.S. Appl. No. 13/241,380; 14 pages.
Response to Office Action filed on May 3, 2012; for U.S. Appl. No. 13/241,380; 16 pages.
Final Office Action dated Jul. 19, 2012; for U.S. Appl. No. 13/241,380; 13 pages.
Response to Final Office Action dated Oct. 9, 2012; for U.S. Appl. No. 13/241,380; 6 pages.
Notice of Allowance dated Oct. 29, 2012; for U.S. Appl. No. 13/241,380; 11 pages.
Request for Continued Examination dated Jan. 24, 2013; for U.S. Appl. No. 13/241,380; 3 pages.
Notice of Allowance dated Feb. 21, 2013; for U.S. Appl. No. 13/241,380; 9 pages.
Office Action dated Jul. 6, 2012; for U.S. Appl. No. 12/706,318; 29 pages.
Response to Office Action filed Sep. 27, 2012; for U.S. Appl. No. 12/706,318; 12 pages.
Supplemental Response to Office Action filed on Oct. 2, 2012; for U.S. Appl. No. 12/706,318; 12 pages.
Notice of Allowance dated Dec. 10, 2012; for U.S. Appl. No. 12/706,318; 9 pages.
Letter under 37 C.F.R. §1.56 filed Jul. 25, 2013 for U.S. Appl. No. 13/946,380; 2 pages.
Non-Final Office Action dated Jul. 9, 2015; for U.S. Appl. No. 13/946,380; 31 pages.
Amendment in response to Office Action dated Jul. 9, 2015 filed on Nov. 9, 2015 for U.S. Appl. No. 13/946,380; 26 pages.
Final Office Action dated Dec. 15, 2015; For U.S. Appl. No. 13/946,380; 36 pages.
Amendment in response to Final Office Action dated Dec. 15, 2015 and filed on Apr. 12, 2016 for U.S. Appl. No. 13/946,380; 17 pages.
Non-Final Office Action dated Aug. 26, 2016 for U.S. Appl. No. 13/946,380; 40 pages.
Response filed on Nov. 9, 2016 to the Non-Final Office Action dated Aug. 26, 2016; for U.S. Appl. No. 13/946,380; 19 pages.
Final Office Action dated Jan. 12, 2017 for U.S. Appl. No. 13/946,380; 32 pages.
Amendment filed on Apr. 11, 2017 for U.S. Appl. No. 13/946,380; 18 pages.
Non-Final Office Action for U.S. Appl. No. 13/946,380 dated May 19, 2017; 20 pages.
Amendment for U.S. Appl. No. 13/946,380, filed Jun. 22, 2017; 8 pages.
Notice of Allowance dated Jul. 13, 2017 for U.S. Appl. No. 13/946,380; 11 pages.

(56) References Cited

OTHER PUBLICATIONS

Amendment Under 37 C.F.R. §1.312 for U.S. Appl. No. 13/946,380, filed Aug. 29, 2017; 3 pages.
DCMD Instruction letter regarding filing regarding Request for Examination dated Feb. 13, 2019 for KR Pat. Appl. No. 10-2016-7004180; 2 pages.
21st Century Letter dated Mar. 14, 2019 regarding Voluntary Amendment and Substantive Examination for KR Pat. Appl. No. 10-2016-7004180; 1 page.
21st Century Listing of Pending Claims filed on Mar. 14, 2019 regarding Voluntary Amendment and Substantive Examination for KR Pat. Appl. No. 10-2016-7004180; 13 pages.
Non-final office action dated Jan. 26, 2018 for U.S. Appl. No. 15/655,135; 49 pages.
Response to Non-Final Office Action dated Jan. 26, 2018 for U.S. Appl. No. 15/655,135; Response filed Apr. 3, 2018; 20 pages.
Response to Office Action filed on Aug. 25, 2020 for U.S. Appl. No. 16/232,348; 16 pages.
U.S. Appl. No. 16/683,800, filed Nov. 14, 2019, David et al.
Infineon Product Brief, TLE 4941plusC, "Differential Hall IC for Wheel Speed Sensing", Oct. 2010, www.infineon.com/sensors, 2 pages.
Infineon Technologies; "Differential Two-Wire Hall Effect Sensor IC;" TLE4942 Preliminary Data Sheet; Jun. 2000; 13 pages.
Johnson et al., "Hybrid Hall Effect Device," Appl. Phys. Lett., vol. 71, No. 7, Aug. 1997, 3 pages.
Kanda et al.; "The Piezo-Hall Effect in n-Silicon;" $22^{nd}$ International Conference on the Physics of Semiconductors; vol. 1, Jan. 1995; 4 pages.
Kapser et al.; "Integrated GMR Based Wheel Speed Sensor for Automotive Applications;" IEEE 2007 Conference on Sensors; Oct. 2007; 4 pages.
Kejik et al.; "Circular Hall Transducer for Angular Position Sensing;" International Solid-State Sensors, Actuators and Microsystems Conference; Transducers; Jun. 2007; 4 pages.
Kejik, P. et al.; "Purely CMOS Angular Position Sensor Based on a New Hall Microchip;" $34^{th}$ Annual Conference of IEEE Industrial Electronics; IECON; Nov. 10-13, 2008; 5 pages.
Kejik, P.et al.; "Ultra Low-Power Angular Position Sensor for High-Speed Portable Applications;" 2009 IEEE Sensors Conference; Oct. 25-28, 2009; 4 pages.
Krammerer et al.: "A Hall effect sensors network insensitive to mechanical stress;" Proceedings of IEEE Sensors; vol. 3, Oct. 2004; 4 pages.
Lagorce et al.; "Magnetic and Mechanical Properties of Micromachined Strontium Ferrite/Polyimide Composites;" Journal of Microelectromechanical Systems; vol. 6, No. 4; Dec. 1997; 15 pages.
Lequesne et al.; "High-Accuracy Magnetic Position Encoder Concept;" IEEE Transactions on Industry Applications; vol. 35, No. 3; May/Jun. 1999; 9 pages.
Lou Law; "Angular Position Sensing with 2-Axis Hall ICs;" Sensors Magazine, vol. 20, No. 3; Mar. 2003; 7 pages.
Magnani et al.; "Mechanical Stress Measurement Electronics Based on Piezo-Resistive and Piezo-Hall Effects;" $9^{th}$ International Conference on Electronics, Circuits and Systems 2002; vol. 1; SBN: 0-7803-7596-3; Dec. 2002; 4 pages.
Manic; "Drift in Silicon Integrated Sensors and Circuits Due to the Thermo-Mechanical Stresses;" Lausanne, École Polytechnique Fédérale De Lausanne 2000; Part 1 of 2; 74 pages.
Manic; "Drift in Silicon Integrated Sensors and Circuits Due to the Thermo-Mechanical Stresses;" Lausanne, École Polytechnique Fédérale De Lausanne 2000; Part 2 of 2; 102 pages.
Manic; "Short and Long-Term Stability Problems of Hall Plates in Plastic Packages;" IEEE $38^{th}$ Annual International Reliability Physics Symposium; Apr. 2000; 6 pages.
Masson et al.; "Multiturn and high precision through-shaft magnetic sensors;" Sensor + Text Conference; Proceedings II; May 2009; 6 pages.

Melexis Microelectronic Integrated Systems; MLX90333; "Triaxis 3D-Joystick Position Sensor;" Data Sheet; Mar. 2009; 43 pages.
Melexis Microelectronic Systems, Hall Applications Guide, Section 3—Applications, 1997, 48 pages.
Melexis MLX 90324; ""Under-the-Hood" Triaxis Rotary Position feat. SENT Protocol;" 3901090324 Data Sheet; Dec. 2008; 40 pages.
Memsic Corporation; AN-00MM-001; "Magnetometer Fundamentals;" Jun. 2008; 6 pages.
Memsic Corporation; AN-00MM-002; "Magnetometer Soldering Methodology;" Jun. 2008; 2 pages.
Memsic Corporation; AN-00MM-003; "Magnetic Sensor Calibration;" Mar. 2008; 5 pages.
Memsic Corporation; AN-00MM-004; "Electronic Tilt Compensation;" Mar. 2008; 5 pages.
Memsic Corporation; AN-00MM-005; "Magnetic Sensor Placement Guidelines;" Oct. 2008; 2 pages.
Memsic Corporation; MMC312xMQ; "Tri-axis Magnetic Sensor, with $I^2C$ Interface;" Aug. 14, 2008; 9 pages.
Memsic Corporation; MMC314xMQ; "Ultra Small 3-axis Magnetic Sensor, with $I^2C$ Interface;" Mar. 31, 2010; 8 pages.
Metz et al.; "Contactless Angle Measurement Using Four Hall Devices on Single Chip;"; International Conference on Solid State Sensors and Actuators; Transducers; vol. 1; Jun. 16-19, 1997; 4 pages.
Micronas GmbH; "HAL® 3625 Programmable Direct Angle Sensor;" Product Information; Sep. 2009; 2 pages.
Motz, et al.; "An Integrated Hall Sensor Platform Design for Position, Angle and Current Sensing;" IEEE Sensors 2006; Exco, Daegu, Korea / Oct. 22-25, 2006; 4 pages.
Motz et al.; "An Integrated Magnetic Sensor with Two Continuous-Time $\Delta\Sigma$-Converters and Stress Compensation Capability;" IEEE International Solid-State Circuits Conference; Digest of Technical Papers; Feb. 6, 2006; ISBN: 1-4244-0079-1; 7 pages.
Motz, et al.; "A Chopped Hall Sensor with Small Jitter and Programmable "True Power-On"Function;" IEEE Journal of Solid-State Circuits; vol. 40, No. 7; Jul. 2005; 8 pages.
Munter; "A Low-offset Spinning-current Hall Plate;" Sensors and Actuators, vol. A21-A23; Jan. 1990; 4 pages.
Munter; "Electronic Circuitry for a Smart Spinning-current Hall Plate with Low Offset;" Sensors and Actuators A; Jun. 1991;.5 pages.
Novotechnik Siedle Group; "How New Angular Positioning Sensor Technology Opens a Broad Range of New Applications;" Vert-X Technology; Dec. 2001; 5 pages.
Oniku et al., "High-Energy-Density Permanent Micromagnets Formed From Heterogeneous Magnetic Powder Mixtures", Interdisciplinary Microsystems Group, Dept. of Electrical and Computer Engineering, University of Florida, Gainesville, FL 32611, USA; Preprint of MEMS 2012 Conf. Paper, 4 pages.
Paranjape et al.; "A CMOS-compatible 2-D vertical Hall magnetic-field sensor using active carrier confinement and post-process micromachining;" The $8^{th}$ International Conference on Solid-State Sensors and Acutators, Physical vol. 53, Issues 1-3; May 1996; 6 pages.
Park et al.: "Batch-Fabricated Microinductors with Electroplated Magnetically Anisotropic and Laminated Alloy Cores", IEEE Transactions on Magnetics, vol. 35, No. 5, Sep. 1999, 10 pages.
Park et al.; "Ferrite-Based Integrated Planar Inductors and Transformers Fabricated at Low Temperature;" IEEE Transactions on Magnetics; vol. 33, No. 5; Sep. 1997; 3 pages.
Partin et al.; "Temperature Stable Hall Effect Sensors;" IEEE Sensors Journal, vol. 6, No. 1; Feb. 2006; 5 pages.
Pastre, et al.; "A Hall Sensor Analog Front End for Current Measurement with Continuous Gain Calibration;" IEEE Sensors Journal; vol. 7, No. 5; May 2007; 8 pages.
Pastre, et al.; "A Hall Sensor-Based Current Measurement Microsystem With Continuous Gain Calibration;" Research in Microelectronics and Electronics, IEEE vol. 2; Jul. 25, 2005; ISBN: 0-7803-9345-7; 4 pages.
Petoussis et al.; "A Novel Hall Effect Sensor Using Elaborate Offset Cancellation Method;" Sensors & Transducers Journal, vol. 100, Issue 1; Jan. 2009; 7 pages.

(56) References Cited

OTHER PUBLICATIONS

Petrie; "Circular Vertical Hall Magnetic Field Sensing Element and Method with a Plurality of Continuous Output Signals;" U.S. Appl. No. 13/035,243, filed Feb. 25, 2011; 56 pages.
Popovic; "Not-plate-like Hall magnetic sensors and their applications;" Sensors and Actuators A: Physical, vol. 85, Issues 1-3; Aug. 2000; 9 pages.
Popovic; "Sensor Microsystems;" Proc. 20th International Conference on Microelectronics (MWIL 95); vol. 2, NIS, Serbia, 12-14; Sep. 1995; 7 pages.
Randhawa; "Monolithic Integrated Hall Devices in Silicon Circuits;" Microelectronics Journal; vol. 12, No. 6; Sep. 14-17, 1981; 6 pages.
Reymond, S. et al.; "True 2D CMOS Integrated Hall Sensor," 2007 IEEE Sensors Conference; Oct. 28-31, 2007; 4 pages.
Roumenin et al.; "Vertical Hall Effect Devices in the Basis of Smart Silicon Sensors;" IEEE Workshop on Intelligent Data Acquisition and Advanced Computing Systems: Technology and Applications; Sep. 5-7, 2005; 4 pages.
Roumenin; "Magnetic sensors continue to advance towards perfection;" Sensors and Actuators A: Physical, vol. 46-47, Issues 1-3; Jan.-Feb. 1995; 7 pages.
Ruther et al.; "Integrated CMOS-Based Sensor Array for Mechanical Stress Mapping;" 5th IEEE Conference on Sensors, Oct. 2007; 4 pages.
Ruther et al.; "Thermomagnetic Residual Offset in Integrated Hall Plates;" IEEE Sensors Journal; vol. 3, No. 6; Dec. 2003; 7 pages.
Sargent; "Switched-capacitor IC controls feedback loop;" EDN; Design Ideas; Feb. 17, 2000; 2 pages.
Schneider et al.; "Temperature Calibration of CMOS Magnetic Vector Probe for Contactless Angle Measurement System;" International Electron Devices Meeting; Dec. 8-11, 1996; 4 pages.
Schott et al.; "Linearizing Integrated Hall Devices;" 1997 International Conference on Solid-State Sensors and Actuators, Jun. 16-19, 1997; 4 pages.
Schott, et al.; "CMOS Single-Chip Electronic Compass with Microcontroller;" IEEE Journal of Solid-State Circuits; vol. 42, No. 12; Dec. 2007; 11 pages.
SENSIMA technology sa; "CVHD: a new concept of Angular Position Sensor;" Slide Presentation for Allegro MicroSystems; Mar. 2009; 17 pages.
Sentron; AN-101; "Angular position sensing with 2-Axis Hall IC 2SA-10;" Feb. 12, 2004; http://www.diegm.uniud.it/petrella/Azionamenti%20Elettrici%20II/Sensori%20e%20trasduttori/Data%20Sheet%20-%202SA-10.pdf; 7 pages.
U.S. Appl. No. 16/899,702, filed Jun. 12, 2020, David et al.
Simon et al.; "Autocalibration of Silicon Hall Devices;" 8th International Conference on Solid-State Sensors and Actuators; vol. 2; Jun. 25, 1995; 4 pages.
Smith et al.; "Low Magnetic Field Sensing with GMR Sensors;" Sensor Magazine; Part 1; Sep. 1999; http://archives.sensorsmag.com/articles/0999/76mail.shtml; 8 pages.
Smith et al.; "Low Magnetic Field Sensing with GMR Sensors;" Sensor Magazine; Part 2; Oct. 1999; http://archives.sensorsmag.com/articles/1099/84/mail.shtml; 11 pages.
Steiner et al.; "Double-Hall Sensor with Self-Compensated Offset;" International Electron Devices Meeting; Dec. 7, 1997; ISBN: 0-7803-4100-7; 4 pages.
Steiner et al; "Offset Reduction in Hall Devices by Continuous Spinning Current Method" Sensors and Actuators A66; 1998; 6 pages.
Stellrecht et al.; Characterization of Hygroscopic Swelling Behavior of Mold Compounds and Plastic Packages; IEEE Transactions on Components and Packaging Technologies; vol. 27, No. 3; Sep. 2004; 8 pages.
Tian et al.; "Multiple Sensors on Pulsed Eddy-Current Detection for 3-D Subsurface Crack Assessment;" IEEE Sensors Journal, vol. 5, No. 1; Feb. 2005; 7 pages.

Trontelj et al; "CMOS Integrated Magnetic Field Source Used as a Reference in Magnetic Field Sensors on Common Substrate;" WEP 1-6; IMTC; May 1994; 3 pages.
Van der Meer; et al; "CMOS quad spinning-current Hall-sensor system for compass application;" IEEE Proceedings of Sensors, vol. 3; Oct. 24-27, 2004; 4 pages.
Vogelgesang et al.; Robert Bosch GmbH; "GMR sensors in automotive application;" CS-SNS/ECS Slides Presentation; Mar. 2, 2005; 16 pages.
Volder; "The CORDIC Trigonometric Computing Technique;" The Institute of Radio Engineers, Inc.; IRE Transactions on Electronic Computers, vol. EC, Issue 3; Sep. 1959; 5 pages.
Wu, et al.; "A Chopper Current-Feedback Instrumentation Amplifier with a 1mHz 1/$f$ Noise Corner and an AC-Coupled Ripple-Reduction Loop;" IEEE International Solid-State Circuits Conference; Feb. 10, 2009; 3 pages.
Zou et al.; "Three-Dimensional Die Surface Stress Measurements in Delaminated and Non-Delaminated Plastic Packages;" 48th Electronic Components and Technology Conference; May 25, 1998; 12 pages.
Invitation to Pay Additional fees dated Oct. 2, 2003 for PCT Pat. App. No. PCT/US03/02489; 3 pages.
PCT Search Report dated Nov. 19, 2003 for PCT Pat. App. No. PCT/US03/02489; 9 pages.
EP Board of Appeals Datasheet for the Decision dated Nov. 22, 2007; for European Pat. App. No. 97108803.4; 22 pages.
EP Communication for the Board of Appeals dated Apr. 30, 2009; for European Pat. App. No. 03 710 766.1; 2 pages.
EP Preliminary Opinion from the Board of Appeal dated May 26, 2009; for European Pat. App. No. 03 710 766.1; 52 pages.
Letter from Yuasa and Hara dated Jun. 4, 2008; Japanese First Office Action issued Apr. 7, 2008; for JP Pat. App. No. 2003-568426; 5 pages.
Letter from Yuasa and Hara dated Oct. 21, 2008; Japanese Response to First Office Action filed Sep. 22, 2008; for JP Pat. App. No. 2003-568426; 14 pages.
Letter from Yuasa and Hara dated Dec. 12, 2008; Japanese Second Office Action; for JP Pat. App. No. 2003-568426; 4 pages.
Letter from Yuasa and Hara dated Apr. 23, 2009; Japanese Response to Second Office Action filed Mar. 25, 2009; for JP Pat. App. No. 2003-568426; 8 pages.
Letter from Yuasa and Hara dated Jun. 9, 2011; Japanese Response to Third Office Action filed May 13, 2011; for JP Pat. App. No. 2003-568426; 27 pages.
JP Notice of Allowance dated Nov. 8, 2011; for Japanese Pat. App. No. 2003-568426; 3 pages.
PCT Search Report and Written Opinion of the ISA dated Jul. 15, 2008 for PCT/US2008/053551; 11 pages.
PCT International Preliminary Report on Patentability for PCT/US2008/053551; dated Oct. 8, 2009; 8 pages.
CN Office Action (with English translation) dated Sep. 10, 2010; for Chinese Pat. App. No. 200880008895.6; 14 pages.
Letter from NTD Patent & Trademark Agency Limited Regarding Office Action dated Oct. 13, 2010; for Chinese Pat. App. No. 200880008895.6; 2 pages.
CN Response to Office Action dated Mar. 28, 2011; for Chinese Pat. App. No. 200880008895.6; 7 pages.
CN Notice of Allowance (with English translation) dated Jul. 4, 2011; for Chinese Pat. App. No. 200880008895.6; 4 pages.
JP First Office Action (English translation) dated Jun. 11, 2012; for Japanese Pat. App. No. 2010-501028; 7 pages.
JP Response to First Office Action (with English translation) dated Oct. 16, 2012; for Japanese Pat. App. No. 2010-501028; 12 pages.
JP Second Office Action (English translation) dated Aug. 7, 2013; for Japanese Pat. App. No. 2010-501028; 7 pages.
Office Action/Restriction Requirement dated May 14, 2010; for U.S. Appl. No. 12/037,393; 6 pages.
Response to Office Action/Restriction Requirement filed on Jun. 2, 2010; for U.S. Appl. No. 12/037,393; 1 page.
Office Action dated Jun. 30, 2010; for U.S. Appl. No. 12/037,393; 11 pages.
Response to Office Action filed Oct. 14, 2010; for U.S. Appl. No. 12/037,393; 34 pages.

(56) References Cited

OTHER PUBLICATIONS

Notice of Allowance dated Nov. 3, 2010; for U.S. Appl. No. 12/037,393; 7 pages.
Request for Continued Examination dated Jan. 26, 2011; for U.S. Appl. No. 12/037,393; 1 page.
Notice of Allowance dated Feb. 11, 2011; for U.S. Appl. No. 12/037,393; 6 pages.
Search Report dated Oct. 23, 2009 for PCT Application No. PCT/US2009/031776; 20 pages.
International Preliminary Report on Patentability dated Sep. 10, 2010 for Application No. PCT/US2009/031776; 10 pages.
CN First Office Action (with English translation) dated Aug. 29, 2012; for Chinese Pat. App. No. 200980106535.4; 8 pages.
CN Response to Chinese First Office Action with English claims dated Aug. 29, 2012 filed on Jan. 24, 2013; for Chinese Pat. App. No. 200980106535.4; 20 pages.
Letter from NTD Patent and Trademark Office dated Oct. 10, 2012; for Chinese Pat. App. No. 200980106535.4; 2 pages.
Letter to NTD Patent and Trademark Office dated Dec. 11, 2012; for Chinese Pat. App. No. 200980106535.4; 3 pages.
Letter from NTD Patent and Response filed dated Jan. 19, 2013; for Chinese Pat. App. No. 200980106535.4; 13 pages.
CN Second Office Action (with English translation) dated Apr. 15, 2013; for Chinese Pat. App. No. 200980106535.4; 9 pages.
Letter from NTD Patent and Trademark Office dated May 21, 2013; for Chinese Pat. App. No. 200980106535.4; 2 pages.
Letter to NTD Patent and Trademark Agency dated Jun. 19, 2013; for Chinese Pat. App. No. 200980106535.4; 11 pages.
Letter from NTD Patent and Trademark Agency dated Jul. 11, 2013; for Chinese Pat. App. No. 200980106535.4; 1 page.
JP Notice of Reasons for Rejection (English translation) dated Apr. 4, 2013 for Japanese Pat. App. No. 2010-547666; 4 pages.
Letter from Yuasa and Hara dated May 27, 2013; for Japanese Pat. App. No. 2010-547666; 2 pages.
Response to Reason for Rejection with English claims filed Jul. 3, 2013; for Japanese Pat. App. No. 2010-547666; 11 pages.
JP Notice of Reasons for Rejection (English translation) dated Sep. 29, 2014 for Japanese Pat. App. No. 2010-547666; 8 pages.
Response to Reason for Rejection with English claims filed Jan. 27, 2015; for Japanese Pat. App. No. 2010-547666; 10 pages.
Office Action dated Feb. 2, 2011; for U.S. Appl. No. 12/959,672; 13 pages.
Response to Office Action filed on May 24, 2011; for U.S. Appl. No. 12/959,672; 8 pages.
Response to European Communication filed on Jan. 6, 2021 for European Application No. 19209914.1; 28 pages.
Final Office Action dated Jul. 26, 2018 for U.S. Appl. No. 15/655,135; 38 Pages.
Response to Final Office Action dated Jul. 26, 2018 for U.S. Appl. No. 15/655,135, filed Oct. 11, 2018; 21 Pages.
Request for Continued Examination dated Oct. 29, 2018 for U.S. Appl. No. 15/655,135; 3 Pages.
Notice of Allowance dated Dec. 4, 2018 or U.S. Appl. No. 15/655,135; 13 pages.
Supplemental Notice of Allowability dated Jan. 3, 2019 for U.S. Appl. No. 15/655,135; 9 pages.
Supplemental Notice of Allowability dated Jan. 30, 2019 for U.S. Appl. No. 15/655,135; 9 pages.
Supplemental Notice of Allowability dated Feb. 13, 2019 for U.S. Appl. No. 15/655,135; 9 pages.
Office Action dated Jul. 28, 2016 for U.S. Appl. No. 14/529,669; 25 pages.
Response to Office Action filed on Oct. 28, 2016 for U.S. Appl. No. 14/529,669; 18 pages.
Final Office Action dated Jan. 9, 2017 for U.S. Appl. No. 14/529,669; 11 pages.
Response to Final Office Action filed Mar. 30, 2017 for U.S. Appl. No. 14/529,669; 12 pages.
Notice of Allowance dated Apr. 20, 2017 for U.S. Appl. No. 14/529,669; 8 Pages.
Request for Continued Examination filed Apr. 24, 2017 for U.S. Appl. No. 14/529,669; 3 pages.
Notice of Allowance dated May 18, 2017 for U.S. Appl. No. 14/529,669; 8 pages.
Amendment under 37 C.F.R. §1.312 filed on Jun. 29, 2017 for U.S. Appl. No. 14/529,669; 11 pages.
Response to Rule 312 Communication from USPTO dated Jul. 28, 2017 for U.S. Appl. No. 14/529,669; 2 pages.
PCT International Search Report and Written Opinion of the ISA dated Dec. 23, 2015; For PCT App. No. PCT/US2015/055233; 12 pages.
PCT International Preliminary Report and Written Opinion dated May 11, 2017 for International Application No. PCT/US2015/055233; 8 Pages.
Allowed Specification dated May 6, 2016 for EP Pat. Appl. No. 15787099.9; 71 pages.
Examination report dated May 28, 2018 for European Application No. 15787099.9; 7 Pages.
Notice of Intention to Grant dated May 27, 2019 for EP Pat. Appl. No. 15787099.9; 7 pages.
Reasons for Rejection with English translation dated Mar. 1, 2019 for JP Pat. Appl. No. 2017-522907; 9 pages.
Yuasa and Hara Letter dated Apr. 1, 2019 regarding Reasons for Rejection and English Claims for JP Pat. Appl. No. 2017-522907; 15 pages.
Response filed on May 29, 2019 for Japanese Patent Application No. 2017-522907 with English Translation; 40 Pages.
Notice of Allowance with English Allowed Claims dated Oct. 31, 2019 for Japanese Application No. 2017-522907; 17 pages.
Office Action dated Jul. 10, 2019 for U.S. Appl. No. 15/658,757; 23 pages.
Response to Office Action dated Sep. 23, 2019 for U.S. Appl. No. 15/658,757; 15 pages.
Final Office Action dated Nov. 21, 2019 for U.S. Appl. No. 15/658,757; 24 pages.
Response to Office Action and Request for Continued Examination (RCE) dated Jan. 17, 2020 for U.S. Appl. No. 15/658,757; 19 pages.
Office Action dated Feb. 12, 2020 for U.S. Appl. No. 15/658,757; 24 pages.
Partial European Search Report dated Dec. 4, 2019 for EP Application No. 19198294.1-1022, 13 Pages.
Office Action dated Oct. 24, 2019 for U.S. Appl. No. 16/136,844; 21 pages.
Response to Office Action filed Jan. 17, 2020 for U.S. Appl. No. 16/136,844; 14 pages.
Final Office Action dated Mar. 2, 2020 for U.S. Appl. No. 16/136,844; 22 pages.
Office Action dated Mar. 20, 2015; for U.S. Appl. No. 13/946,417; 54 pages.
Response to Office Action dated Mar. 20, 2015 and filed on Jun. 19, 2015; for U.S. Appl. No. 13/946,417; 15 pages.
Final Office Action dated Aug. 28, 2015; for U.S. Appl. No. 13/946,417; 34 pages.
Response to Final Office Action and Request for Continued Examination dated Nov. 9, 2015; For U.S. Appl. No. 13/946,417; 17 pages.
Non-Final Office Action dated Dec. 3, 2015; for U.S. Appl. No. 13/946,417; 29 pages.
Response to Office Action dated Dec. 3, 2015 and filed on Mar. 3, 2016; For U.S. Appl. No. 13/946,417; 17 pages.
Final Office Action dated Oct. 6, 2016; for U.S. Appl. No. 13/946,417; 45 pages.
Response to Final Office Action dated Oct. 6, 2016 from U.S. Appl. No. 13/946,417, filed Jan. 24, 2017; 14 Pages.
Office Action dated Mar. 15, 2017 from U.S. Appl. No. 13/946,417; 43 Pages.
Response to Office Action filed on Jun. 14, 2017 for U.S. Appl. No. 13/946,417; 10 pages.
Final Office Action dated Sep. 8, 2017 for U.S. Appl. No. 13/946,417; 56 pages.
Response (with RCE) to Final Office Action dated Sep. 8, 2017 for U.S. Appl. No. 13/946,417; Response with RCE filed Nov. 29, 2017; 16 pages.

(56) References Cited

OTHER PUBLICATIONS

Office Action dated Feb. 8, 2018 for U.S. Appl. No. 13/946,417; 37 Pages.
Response to Non-Final Office Action dated Feb. 8, 2018 for U.S. Appl. No. 13/946,417; Response filed on Apr. 19, 2018; 14 pages.
Final Office Action dated Jun. 15, 2018 for U.S. Appl. No. 13/946,417; 33 Pages.
Response to Final Office Action dated Jun. 15, 2018 for U.S. Appl. No. 13/946,417, filed Sep. 14, 2018; 15 Pages.
Office Action dated Feb. 7, 2019 for U.S. Appl. No. 13/946,417; 35 pages.
Response to Office Action dated Feb. 7, 2019 for U.S. Appl. No. 13/946,417; Response filed Apr. 22, 2019; 14 pages.
Notice of Allowance dated Sep. 11, 2019 for U.S. Appl. No. 13/946,417; 10 pages.
Supplemental Notice of Allowability dated Oct. 2, 2019 for U.S. Appl. No. 13/946,417; 7 pages.
International Search Report and Written Opinion dated Oct. 28, 2014 for Int'l PCT Application PCT/US2014/044991; 12 pages.
PCT International Preliminary Report and Written Opinion dated Jan. 28, 2016 for International Application No. PCT/US2014/044991; 9 Pages.
Office Action dated Nov. 3, 2016 regarding U.S. Appl. No. 14/529,606; 11 pages.
Response to Examination report dated May 28, 2018 for European Application No. 15787099.9 as filed on Sep. 17, 2018; 15 Pages.
Response to European Communication filed on Nov. 6, 2020 for European Application No. 19198294.1; 16 pages.
Response to Office Action filed on Jan. 25, 2017 for U.S. Appl. No. 14/529,606; 19 pages.
Notice of Allowance dated Mar. 16, 2017 for U.S. Appl. No. 14/529,606; 9 pages.
Preliminary Amendment filed on Apr. 21, 2017 for U.S. Appl. No. 14/529,606; 12 pages.
Request for Continued Examination filed on Apr. 21, 2017 for U.S. Appl. No. 14/529,606; 3 pages.
Non-final Office Action dated May 19, 2017 for U.S. Appl. No. 14/529,606; 11 pages.
Response to Office Action filed on Jul. 5, 2017 for U.S. Appl. No. 14/529,606; 13 pages.
Notice of Allowance dated Aug. 4, 2017 for U.S. Appl. No. 14/529,606; 9 pages.
Instruction Letter to Yuasa & Hara dated Jul. 30, 2018 instructions to file Voluntary Amendment for Japanese Application No. 2017-522906; 2 Pages.
English translations of Claims on File dated Sep. 20, 2018 for Japanese Application No. 2017-522906; 7 Pages.
Letter from Foreign Associate dated Sep. 20, 2018 reporting voluntary amendment filed for Japanese Application No. 2017-522906; 2 Pages.
Notice of Reason for rejection with English translation dated Oct. 23, 2019 for Japanese Application No. 2017-522906; 5 pages.
Response to Notice of Reason for rejection with English translation dated Dec. 26, 2019 for Japanese Application No. 2017-522906; 16 pages.
Allowed Specification dated Jul. 7, 2016 for EP Pat. Appl. No. 15853626.8; 104 pages.
A.A. Thornton letter dated Nov. 26, 2018 in response to Official Communication dated Jul. 9, 2018 for EP Pat. Appl. No. 15853626.8; 4 pages.
Amended Claims filed on Nov. 26, 2018 for EP Pat. Appl. No. 15853626.8; 4 pages.
Intention to Grant dated Apr. 25, 2019 for EP Pat. Appl. No. 15853626.8-1022; 7 pages.
Communication under Rule 71(3) EPC dated Oct. 10, 2018 for International Application No. 15791066.2; 7 Pages.
Allowed Specification dated May 6, 2016 for International Application No. 15791066.2; 102 Pages.
Notice of Allowance with English Allowed claims dated Jun. 10, 2019 for Japanese Patent Application No. 2017-522908 with English Translation of Allowed Claims; 12 Pages.
Office Action dated Jul. 14, 2016 for U.S. Appl. No. 14/529,594; 94 pages.
Response to Office Action filed Oct. 14, 2016 for U.S. Appl. No. 14/529,594; 29 pages.
Final Office Action dated Jan. 4, 2017 for U.S. Appl. No. 14/529,594; 38 pages.
Response to Final Office Action filed on Mar. 31, 2017 for U.S. Appl. No. 14/529,594, 16 pages.
Notice of Allowance dated May 10, 2017 for U.S. Appl. No. 14/529,594; 8 pages.
Preliminary Amendment filed on Jun. 16, 2017 for U.S. Appl. No. 15/624,898; 15 pages.
Office Action dated Nov. 28, 2018 for U.S. Appl. No. 15/624,898; 35 Pages.
Response to Office Action dated Nov. 28, 2018 and filed on Jan. 11, 2019 for U.S. Appl. No. 15/624,898; 17 pages.
Final Office Action dated Feb. 14, 2019 for U.S. Appl. No. 15/624,898; 30 pages.
Amendment under 37 C.F.R. §1.114 filed on Apr. 10, 2019 for U.S. Appl. No. 15/624,898; 19 pages.
Office Action dated Sep. 26, 2019 for U.S. Appl. No. 15/624,898; 10 pages.
Response to Office Action dated Nov. 7, 2019 for U.S. Appl. No. 15/624,898; 14 pages.
Final Office Action dated Jan. 17, 2020 for U.S. Appl. No. 15/624,898; 13 pages.
Response to Final Office Action dated Apr. 9, 2020 for U.S. Appl. No. 15/624,898; 15 pages.
Notice of Allowance dated Apr. 22, 2020 for U.S. Appl. No. 15/624,898; 8 pages.
Extended European Search Report dated Apr. 3, 2020 for European Application No. 19198294.1; 20 pages.
Response to Office Action filed on May 11, 2020 for U.S. Appl. No. 15/658,757; 15 pages.
Extended European Search Report dated May 4, 2020 for European Application No. 19209914.1; 9 pages.
Notice of Allowance dated May 28, 2020 for U.S. Appl. No. 15/658,757; 8 pages.
Response to Office Action and Request for Examination (RCE) dated Jun. 2, 2020 for U.S. Appl. No. 16/136,844; 13 pages.
Notice of Allowance dated Jun. 23, 2020 for U.S. Appl. No. 16/136,844; 12 pages.
Office Action dated Jun. 8, 2020 for U.S. Appl. No. 16/232,348; 64 pages.
Notice of Allowance dated Sep. 16, 2020 for U.S. Appl. No. 16/232,348; 8 pages.
Ahn et al., "A New Toroidal-Meander Type Integrated Inductor With A Multilevel Meander Magnetic Core", IEEE Transactions on Magnetics, vol. 30, No. 1, Jan. 1994, 7 pages.
Allegro MicroSystems, Inc.; "3212 Data Sheet: Micropower, Ultra-Sensitive Hall-Effect Switch", published Sep. 22, 2004; 12 pages.
Allegro MicroSystems, Inc.; "3235 Data Sheet: Dual-Output Hall-Effect Switch", http://www.datasheetcatalog.org/datasheets/90/205047_DS.pdf; downloaded Sep. 29, 2010; 6 pages.
Allegro MicroSystems, Inc.; "3425 Data Sheet: Dual, Chopper-Stabilized, Ultra-Sensitive Bipolar Hall-Effect Switch", published Jun. 28, 2002; 10 pages.
Allegro MicroSystems, Inc.; "27701-AN Data Sheet: Hall-Effect IC Applications Guide", Application Information, Rev. 2; http://www.allegromicro.com/en/products/design/hall-effect-sensor-ic-applications-guide/AN27701.pdf; downloaded Sep. 29, 2010; 40 pages.
Allegro MicroSystems, Inc.; "A1140/41/42/43 Data Sheet: Sensitive Two-Wire Chopper-Stabilized Unipolar Hall-Effect Switches", published Sep. 9, 2004; 10 pages.
Allegro MicroSystems, Inc.; "A1174 Data Sheet: Ultrasensitive Hall Effect Latch with Internally or Externally Controlled Sample and Sleep Periods for Track Ball and Scroll Wheel Applications", published Jul. 25, 2008; 13 pages.

(56) References Cited

OTHER PUBLICATIONS

Allegro MicroSystems, Inc.; "A1230 Data Sheet: Ultra-Sensitive Dual-Channel Quadrature Hall-Effect Bipolar Switch", published Mar. 26, 2010; 16 pages.
Allegro MicroSystems, Inc. "A1341 Data Sheet: High Precision, Highly Programmable Linear Hall Effect Sensor IC with EEPROM, Output Protocols SENT and PWM, and Advanced Output Linearization Capabilities", May 17, 2010; 46 pages.
Allegro MicroSystems, Inc., "A1351 Data Sheet: High Precision Linear Hall Effect Sensor with a Push/Pull, Pulse Width Modulated Output", published Mar. 7, 2008; 23 pages.
Allegro MicroSystems, Inc., "A1354 Data Sheet: High Precision 2-Wire Linear Hall Effect Sensor IC with a Pulse Width Modulated Output", 22 pages.
Allegro MicroSystems, Inc.; "A1356 Data Sheet: High Precision Linear Hall-Effect Sensor with an Open Drain Pulse Width Modulated Output", 20 pages.
Allegro MicroSystems, Inc.; "A1360, A1361 and A1362 Data Sheet: Low-Noise Programmable Linear Hall Effect Sensors with Adjustable Bandwidth (50 kHz Maximum) and Analog Output", published Mar. 18, 2008; 25 pages.
Allegro MicroSystems, Inc. "Data Sheet ATS601LSG: Non-TPOS, Tooth Detecting Speed Sensor", Nov. 1, 2011; 9 pages.
Allegro "True Zero-Speed Low-Jitter High Accuracy Gear Tooth Sensor", ATS625LSG; 2005; Allegro MicroSystems, Inc. Worcester, MA 01615; 21 pages.
Allegro MicroSystems, Inc. "ATS645LSH Data Sheet: Two-Wire True Zero Speed Miniature Differential Peak-Detecting Gear Tooth Sensor",2004; Allegro MicroSystems, Inc., Worcester, MA 01615; 14 pages.
Allegro MicroSystems, Inc.; "ATS675LSE Data Sheet: Self-Calibrating TPOS Speed Sensor Optimized for Automotive Cam Sensing Applications", published Jul. 11, 2008; 13 pages.
Allegro MicroSystems, Inc., "Gear-Tooth Sensor For Automotive Applications", Aug. 3, 2001, 2 pages.
Allegro MicroSystems, Inc., "Hall-Effect IC Applications Guide", http://www.allegromicro.com/en/Products/Design/an/an27701.pdf, Copyright 1987, 1997, 36 pages.
Atherton et al.; "Sensor Signal Conditioning—an IC Designer's Perspective", IEEE Electro International; Apr. 26-28, 1991; 6 pages.
Ausserlechner et al.; "Compensation of the Piezo-Hall Effect in Integrated Hall Sensors on (100)-Si", IEEE Sensors Journal, vol. 7, No. 11; Nov. 2007; ISBN: 1530-437X; 8 pages.
Ausserlechner et al.; "Drift of Magnetic Sensitivity of Small Hall Sensors Due to Moisture Absorbed by the IC-Package", Proceedings of IEEE Sensors, 2004; vol. 1; Oct. 24, 2004; ISBN:0-7803-8692-2; 4 pages.
Ausserlechner; "Limits of Offset Cancellation by the Principle of Spinning Current Hall Probe", Proceedings of IEEE Sensors; Oct. 2004; 4 pages.
Ausserlechner; "The piezo-Hall effect in n-silicon for arbitrary crystal orientation", Proceedings of IEEE Sensors; vol. 3; Oct. 24, 2004; ISBN: 0-7803-8692-2; 4 pages.
Austria Microsystems; "AS5040 datasheet; 10-Bit Programmable Magnetic Rotary Encoder", Revision 1.1; Jan. 2004; 20 pages.
Bahreyni, et al.; "A Resonant Micromachined Magnetic Field Sensor", IEEE Sensors Journal; vol. 7, No. 9, Sep. 2007; 9 pages.
Banjevic et al.; "2D CMOS Integrated Magnetometer Based on the Miniaturized Circular Vertical Hall Device" International Solid-State Sensors, Actuators and Microsystems Conference; Transducers; Jun. 21-25, 2009; p. 4 pages.
Banjevic; "High Bandwidth CMOS Magnetic Sensors Based on the Miniaturized Circular Vertical Hall Device" Sep. 2011; 153 pages.
Barrettino, et al.; "CMOS-Based Monolithic Controllers for Smart Sensors Comprising Micromembranes and Microcantilevers" IEEE Transactions on Circuits and Systems—I Regular Papers vol. 54, No. 1; Jan. 2007; 12 pages.
Baschirotto et al.; "Development and Analysis of PCB Vector 2-D Magnetic Field Sensor System for Electronic Compass" IEEE Sensors Journal vol. 6, No. 2; Apr. 2006; 7 pages.

Bilotti et al.; "Monolithic Magnetic Hall Sensor Using Dynamic Quadrature Offset Cancellation;" IEEE Journal of Solid-State Circuits; vol. 32, Issue 6; Jun. 1997; 8 pages.
Blanchard et al.; "Cylindrical Hall Device;" International Electron Devices Meeting; Dec. 8-11, 1996; 4 pages.
Bosch, Robert, GMBH Stuttgart; "Active Sensor for ABS/ASR/VDC-Systems with 2-Wire-Current Interface;" Specification TLE4941/TLE4942; Version 5; Jul. 25, 2000; 44 pages.
Bowers et al.; "Microfabrication and Process Integration of Powder-Based Permanent Magnets;" Technologies for Future Micro-Nano Manufacturing Workshop; Aug. 2011; 4 pages.
Burger et al.; "New fully integrated 3-D silicon Hall sensor for precise angular-position measurements;" Sensors and Actuators, A 67; May 1998; 5 pages.
Daughton "Spin-Dependent Sensors" Proceedings of the IEEE, vol. 91, No. 5, May 2003; 6 pages.
Demierre, et al.; "Reference Magnetic Actuator for Self-Calibration of a Very Small Hall Sensor Array;" Sensors and Actuators A97-98; Apr. 2002; 8 pages.
Drljaca, et al.; "Nonlinear Effects In Magnetic Angular Position Sensor With Integrated Flux Concentrator;" Proc. $23^{rd}$ International Conference on Microelectronics (MIEL2002); vol. 1; NIS; Yugoslavia; May 12-15, 2002; 4 pages.
Dwyer, "Back-Biased Packaging Advances (SE, SG & SH versus SA & SB)," http://www.allegromicro.com/en/Products/Design/packaging_advances/index.asp, Copyright 2008, 5 pages.
Dwyer; Allegro MicroSystems, Inc.; "AN296061 Data Sheet: Ring Magnet Speed Sensing for Electronic Power Steering;" published Jul. 21, 2009; 4 pages.
Freitas et al.; "Giant magnetoresistive sensors for rotational speed control;" Journal of Applied Physics, vol. 85, No. 8; Apr. 15, 1999; 3 pages.
Frick, et al.; "CMOS Microsystem for AC Current Measurement with Galvanic Isolation;" IEEE Sensors Journal; vol. 3, No. 6; Dec. 2003; 9 pages.
Gerhauser, H., "Intelligente 3D-Magnetfeld Sensorik;" Fraunhofer-Institut für Integrierte Schaltungen IIS; www.iis.fraunhofer.de/asic/analog; Oct. 2009; 12 pages.
Gilbert; "Technical Advances in Hall-Effect Sensing;" Allegro MicroSystems, Inc. Product Description; May 10, 2008; 7 pages.
Häberli et al.; "Contactless Angle Measurements by CMOS Magnetic Sensor with On Chip Read-Out Circuit;" The $8^{th}$ International Conference on Solid-State Sensors and Actuators and Eurosensors IX; Jan. 25-29, 1995; 4 pages.
Häberli et al.; "Two-Dimensional Magnetic Microsensor with On-Chip Signal Processing for Contactless Angle Measurement;" IEEE Journal of Solid-State Circuits, vol. 31, No. 12; Dec. 1996; 6 pages.
Halg; "Piezo-Hall Coefficients of n-Type Silicon;" Journal of Applied Physics; vol. 64, No. 1; Jul. 1, 1998; 7 pages.
Hiligsmann et al.; "Monolithic 360 Degrees Rotary Position Sensor IC;" 2004 IEEE Proceedings of Sensors, vol. 3; Oct. 24-27, 2004; 6 pages.
Honeywell International, Inc., "Hall Effect Sensing and Application", Micro Switch Sensing and Control, Chapter 3, http://content.honeywell.com/sensing/prodinfo/solidstate/technical/hallbook.pdf, date unavailable, 10 pages.
Hosticka; "CMOS Sensor Systems;" Sensors and Actuators A66; Apr. 1998; 7 pages.
Office Action dated Jun. 8, 2020 for U.S. Appl. No. 16/232,348; 11 pages.
Notice of Allowance dated Jun. 23, 2020 for U.S. Appl. No. 16/136,844; 9 pages.
Notice of Allowance dated Sep. 16, 2020 for U.S. Appl. No. 16/232,348; 6 pages.
U.S. Appl. No. 16/232,348, filed Dec. 26, 2018, Eagen et al.
Extended European Search Report dated Jun. 18, 2021 for European Application No. 21164122.0; 12 Pages.
European Examination Report dated Apr. 22, 2021 for European Application No. 19198294.1; 9 pages.
Notice of Allowance dated Sep. 24, 2021 for U.S. Appl. No. 16/683,800; 11 pages.
Office Action dated Nov. 10, 2021 for U.S. Appl. No. 16/899,702; 25 pages.

(56) References Cited

OTHER PUBLICATIONS

European Response filed Oct. 27, 2021 for European Application No. 19198294.1; 40 pages.
Korean Office Action dated Oct. 29, 2021 for Korean Application No. 10-2017-7014362; 19 pages.

\* cited by examiner

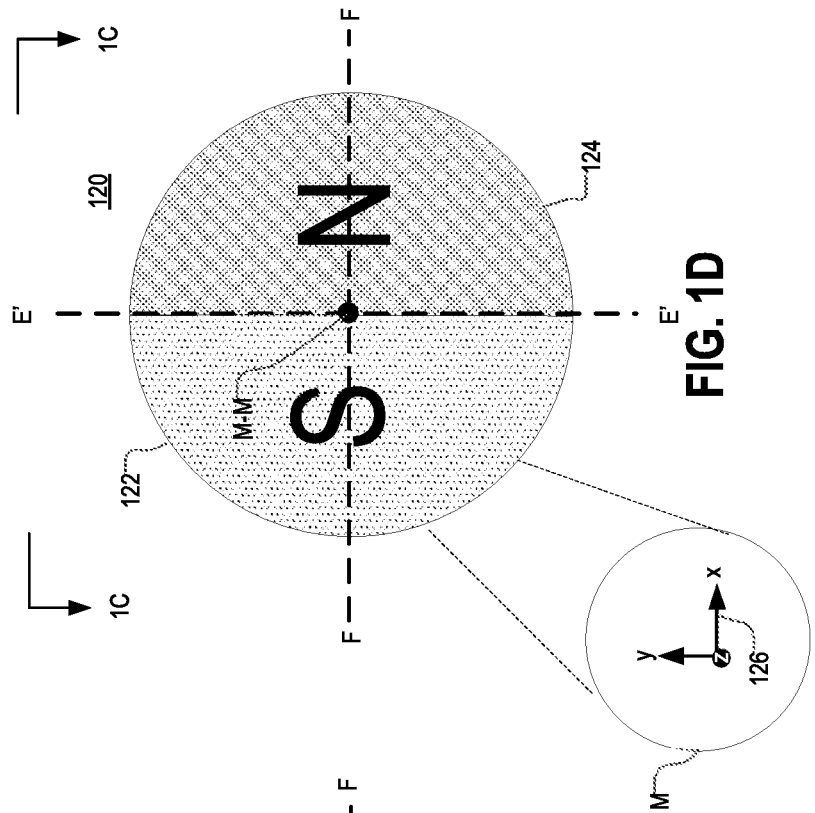
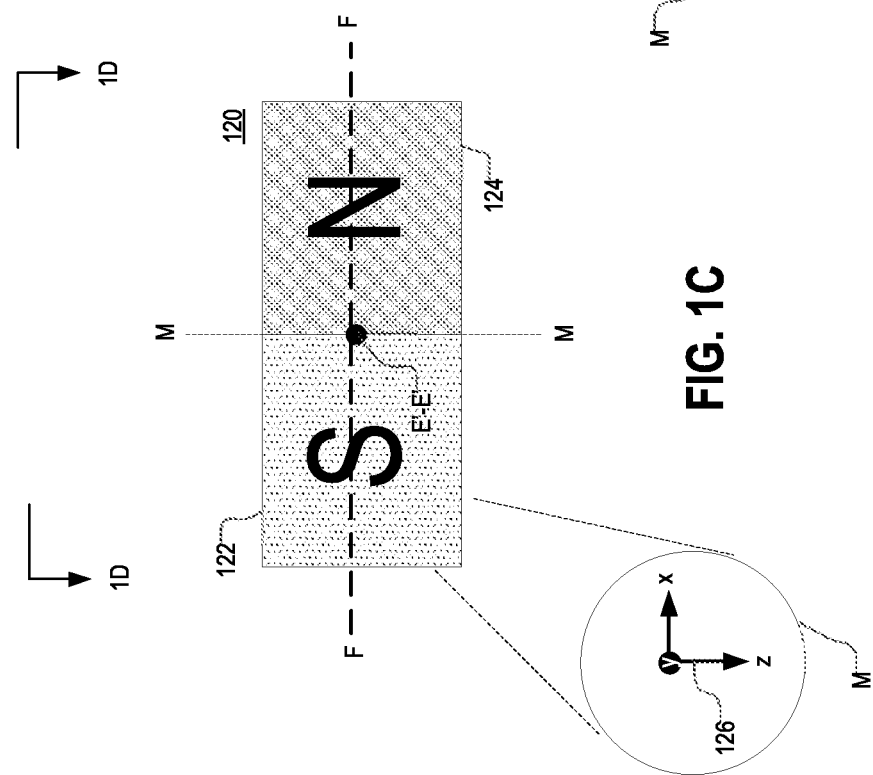
FIG. 1C
FIG. 1D

HIGH PERFORMANCE MAGNETIC ANGLE SENSOR

BACKGROUND

Magnetic angle sensors detect the orientation of an applied magnetic field by using integrated sensor elements. Magnetic angle sensors are used in industrial and automotive applications where it is desirable to measure a rotational position of a shaft (or another element). For example, in automotive applications, angle sensors may be used to detect camshaft position, steering wheel position, and throttle valve position. Magnetic angle sensors are advantageous over alternative means for detecting shaft position, such as potentiometers and optical sensors because they tend to be small, free of wear, and robust against dirt and pollution.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a sensor is provided for detecting an orientation of a magnet, the sensor comprising: a first sensor array including a first plurality of sensor elements that are arranged along a first line; a second sensor array including a second plurality of sensor elements that are arranged along a second line; and a processing circuitry configured to: detect a magnetic field produced by the magnet by using the first sensor array, and identify a first point on the first line where at least one component of the magnetic field has a predetermined value; detect the magnetic field by using the second sensor array, and identify a second point on the second line where at least one component of the magnetic field has the predetermined value; detect an orientation of the magnet relative to the sensor based on the first point and the second point; and output an indication of the orientation of the magnet based on the first point and the second point.

According to aspects of the disclosure, a sensor for detecting an orientation of a magnet, the sensor comprising: a first sensor array including a first plurality of sensor elements that are arranged along a first line; a second sensor army including a second plurality of sensor elements that are arranged along a second line; and a processing circuitry configured to: identify a first pair of sensor elements in the first sensor array where a magnetic field produced by the magnet changes sign; identify a first point on the first line where at least one component of the magnetic field is substantially zero, the first point being identified based on respective readings that are taken using the sensor elements in the first pair; identify a second pair of sensor elements in the second sensor array where the magnetic field produced by the sensor changes sign; identify a second point on the second line where at least one component of the magnetic field is substantially zero, the second point being identified based on respective readings that are taken using the sensor elements in the second pair; detect the orientation of the magnet relative to the sensor based on the first point, the second point, and a distance between the first sensor array and the second sensor array; and output an indication of the orientation of the magnet.

According to aspects of the disclosure, a method for detecting an orientation of a magnet relative to a sensor, the sensor including a first sensor array having a plurality of sensor elements that are arranged along a first line and a second sensor array having a second plurality of sensor elements that are arranged along a second line, the method comprising: detecting a magnetic field produced by the magnet with the first sensor array; identifying a first point on the first line where at least one component of the magnetic field has a predetermined value; detecting the magnetic field with the second sensor array, and identifying a second point on the second line where the at least one component of the magnetic field has the predetermined value; detecting an orientation of the magnet relative to the sensor based on the first point and the second point; and outputting an indication of the orientation of the magnet based on the first point and the second point.

BRIEF DESCRIPTION OF THE DRAWING FIGURES

Other aspects, features, and advantages of the claimed concepts will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1C is a side view of an example of a magnet that is part of the electromechanical system of FIG. 1A, according to aspects of the disclosure;

FIG. 1D is a top-down view of the magnet of FIG. 1B, according to aspects of the disclosure;

DETAILED DESCRIPTION

According to aspects of the disclosure, a magnetic angle sensor is disclosed that is arranged to detect the orientation of a magnet relative to a die included in the sensor. The magnetic angle sensor may include a first sensor array, a second sensor array, and processing circuitry. The first sensor array may include a plurality of sensor elements that are arranged along a first axis. The second sensor array may include a plurality of sensor elements that are arranged along a second axis. The processing circuitry may be configured to: (i) identify a first point on the first axis where the level of a magnetic field produced by the magnet has a predetermined value (e.g., zero or another value), (ii) identify a second point on the second axis where the magnetic field has the predetermined value, and (iii) estimate an orientation of a magnet (e.g., an angular position of the magnet) based on the first point and the second point.

Figure 1A:
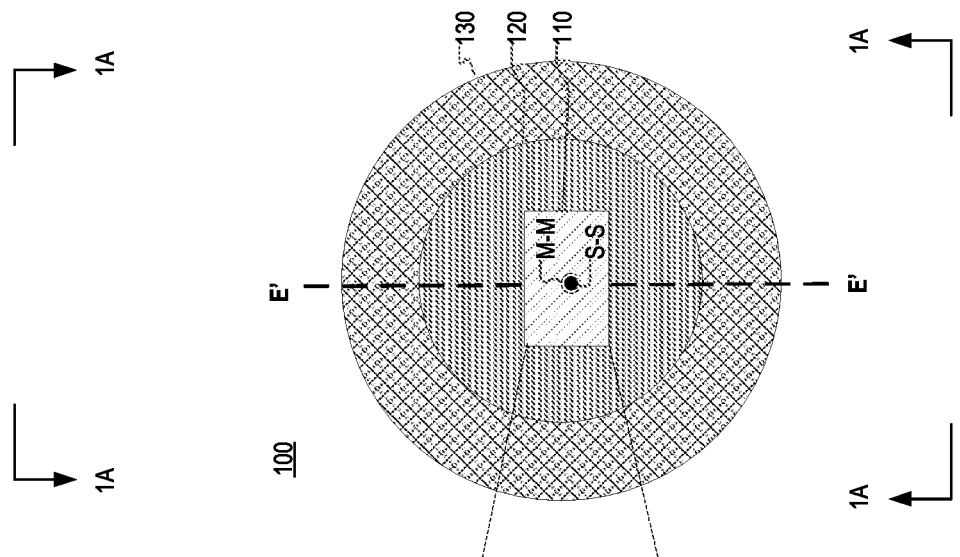
FIG. 1A is a side view of an example of an electromechanical system, according to aspects of the disclosure.
Figure 1B:
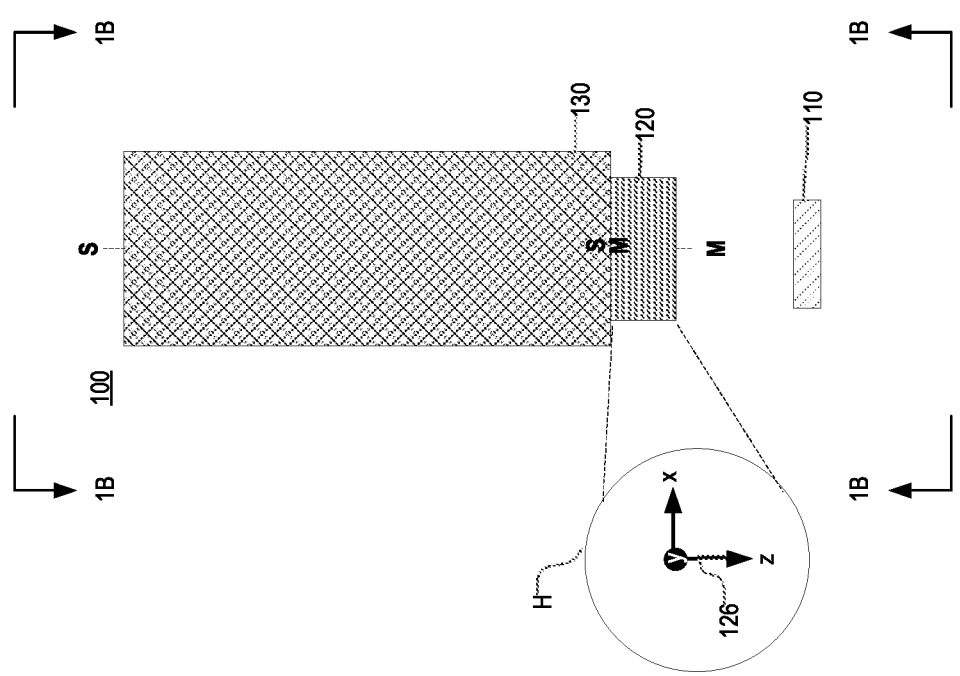
FIG. 1B is a bottom-up view of the electromechanical system of FIG. 1A, according to aspects of the disclosure.

FIGS. 1A-B show an example of a system 100, according to aspects of the disclosure. The system 100 may include a sensor 110, a magnet 120, and a shaft 130. The shaft 130 may have a central, longitudinal axis S-S and it may be coupled to the magnet 120, as shown. In operation, the shaft 130 may be arranged to rotate about the longitudinal axis S-S, causing the magnet 120 to rotate with it. The sensor 110 may be disposed proximate the magnet 120 (e.g., positioned underneath the magnet as illustrated in FIG. 1A), and it may be configured to output a signal that indicates the rotational angle of the magnet 120 relative to the sensor 110. Although in the present example the sensor 110 is positioned underneath the magnet 120, alternative implementations are possible in which the sensor is positioned to the side of the magnet 120 and/or above the magnet 120. Stated succinctly, the present disclosure is not limited to any specific positioning of the sensor 110 with respect to the magnet 120.

FIGS. 1C-D shown the magnet 120 in further detail. As illustrated in FIGS. 1C-D, the magnet 120 may have a cylindrical shape, and magnetic axes M-M and E'-E', which together define a plane that separates the magnet's 120 magnetic poles 122 and 124. Furthermore, the magnet 120 may have a zero-field line E'-E', which is orthogonal to the magnetic axis F-F and parallel (or arranged at an angle) to the plane of the sensor 110. The magnet 120 may be configured to produce a magnetic field H which is defined in terms of a three-dimensional coordinate system 126. As illustrated, the coordinate system 126 may have an x-axis, a y-axis, and a z-axis. In this regard, the magnetic field H may have an x-axis component, a y-axis component, and a z-axis component. According to the present example, the magnetic axis M-M of the magnet 120 is parallel with the z-axis component of the magnetic field H (and the z-axis of the coordinate system 126), whereas the magnetic axis F-F is orthogonal to the z-axis component of the magnetic field H, and extends in the plane defined by the x-axis and the y-axis of the coordinate system 126. According to the present example, the x-axis component of the magnetic field H is parallel with the x-axis of the coordinate system 126, and the y-axis component of the magnetic field H is parallel with the y-axis of the coordinate system 126. Although in the present example, the axis M-M is aligned with the longitudinal axis S-S of the shaft 130, alternative implementations are possible in which the axis M-M is offset from to the longitudinal axis S-S.

Furthermore, according to the present example, the sensor 110 is configured to measure the level of the z-axis component of the magnetic field H, and use the level of the z-axis component of the magnetic field H as a basis for calculating the rotational angle of the magnet 120 relative to the sensor 110. The rotational angle of the magnet 120 can be expressed in terms of the orientation of the zero-field axis E'-E' of the magnet 120 relative to axes A-A and B-B in the plane of the sensor 110. The relationship between: (i) the level of the z-axis component of the magnetic field H and (ii) the orientation of the zero-field axis E'-E' of the magnet 120 relative to the plane of the sensor 110 is illustrated by FIG. 4B.

Figure 1E:
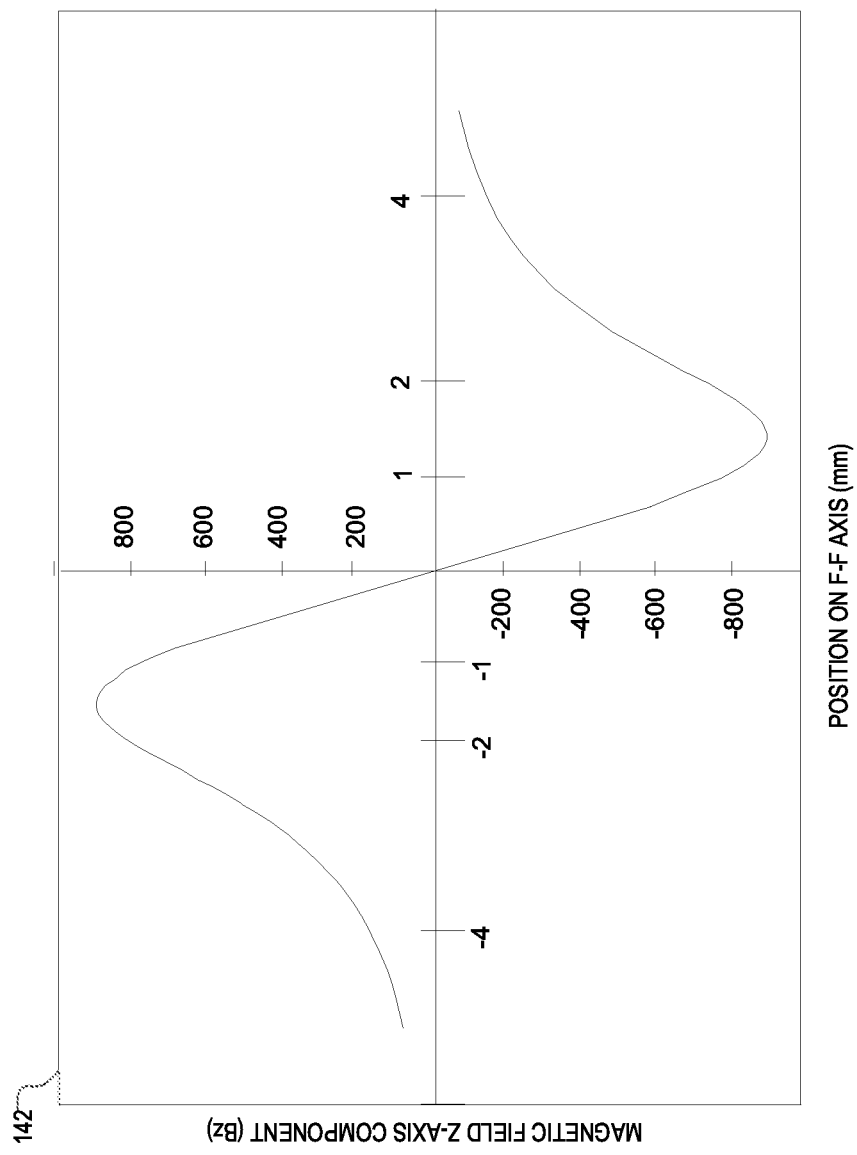
FIG. 1E is a plot of the level of the z-axis component of a magnetic field generated by the magnet of FIG. 1C, according to aspects of the disclosure.

FIG. 1E shows a plot 142 of the field distribution of the z-axis component of the magnetic field H along the magnetic axis F-F. The origin of the plot corresponds to the location of the center of the magnet 120. The sensor 110, is positioned under the region of the axis F-F, which extends between 1 mm and −1 mm, and it is configured to measure the z-axis component of the magnetic field M in this region. The plot 142 is provided to illustrate that the z-axis component of the magnetic field M, in the region measured by the sensor 110, is quite linear, which in turn permits the use of interpolation to determine the orientation of the magnet 120 relative to the sensor 110. The manner in which interpolation is used to determine orientation of the magnet 120 is discussed further below with respect to FIGS. 2-7.

Figure 2:
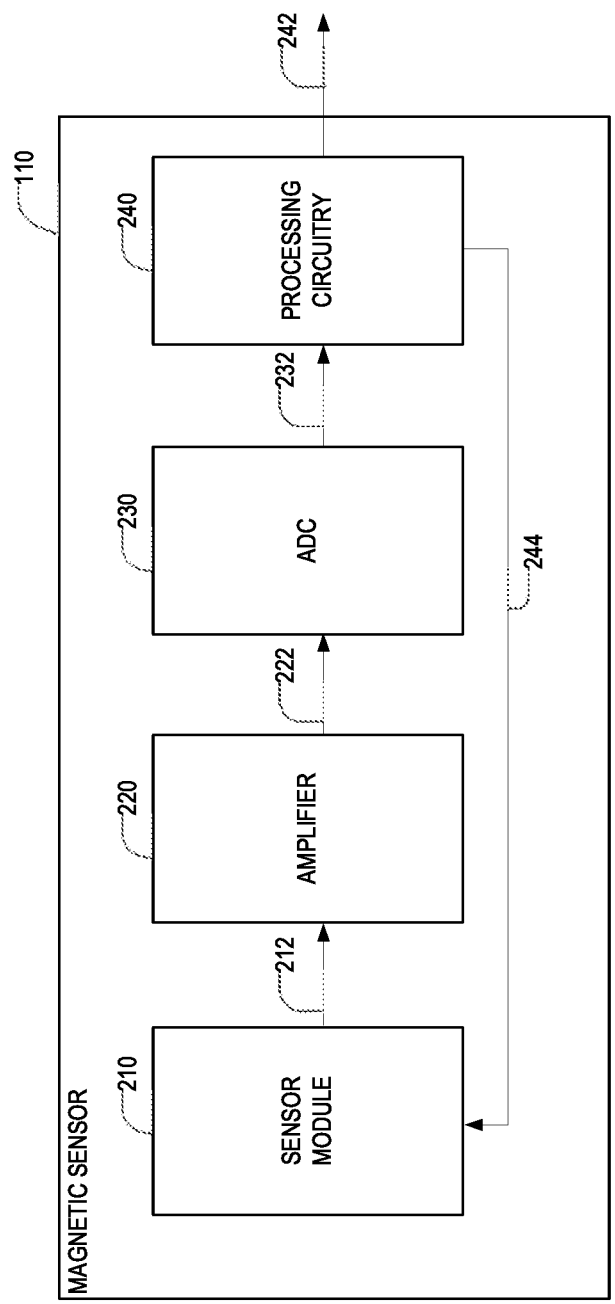
FIG. 2 is a diagram of an example of a magnetic angle sensor, according to aspects of the disclosure.

FIG. 2 shows a block diagram of the sensor 110, according to aspects of the disclosure. As illustrated, the sensor 110 may include a sensor module 210, an amplifier 220, an analog-to-digital converter (ADC 230), and a processing circuitry 240. The sensor 110 may include a plurality of sensor elements (shown in FIG. 3), and it may be configured to output signal(s) 212 that are generated by one or more of the sensor elements. The amplifier 220 may amplify the signal 212 to produce an amplified signal 222, which is subsequently supplied to the ADC 230. The ADC 230 may digitize the amplified signal 222 to produce a digital signal 232, which is subsequently supplied to the processing circuitry 240. The processing circuitry 240 may be configured to process the digital signal 232 to determine the orientation of the magnet 120 relative to the sensor 110 and output a signal 242 that indicates the orientation of the magnet 120 relative to the sensor 110. The signal 242 may be either a digital signal or an analog signal (in which case the processing circuitry 240 would include a DAC). Furthermore, the processing circuitry 240 may be configured to provide the sensor module 210 with a selection signal 244, which is used to select one or more of the sensor elements in the sensor 110. The manner in which the selection signal 244 is used is discussed further below with respect to FIG. 3.

Figure 3:
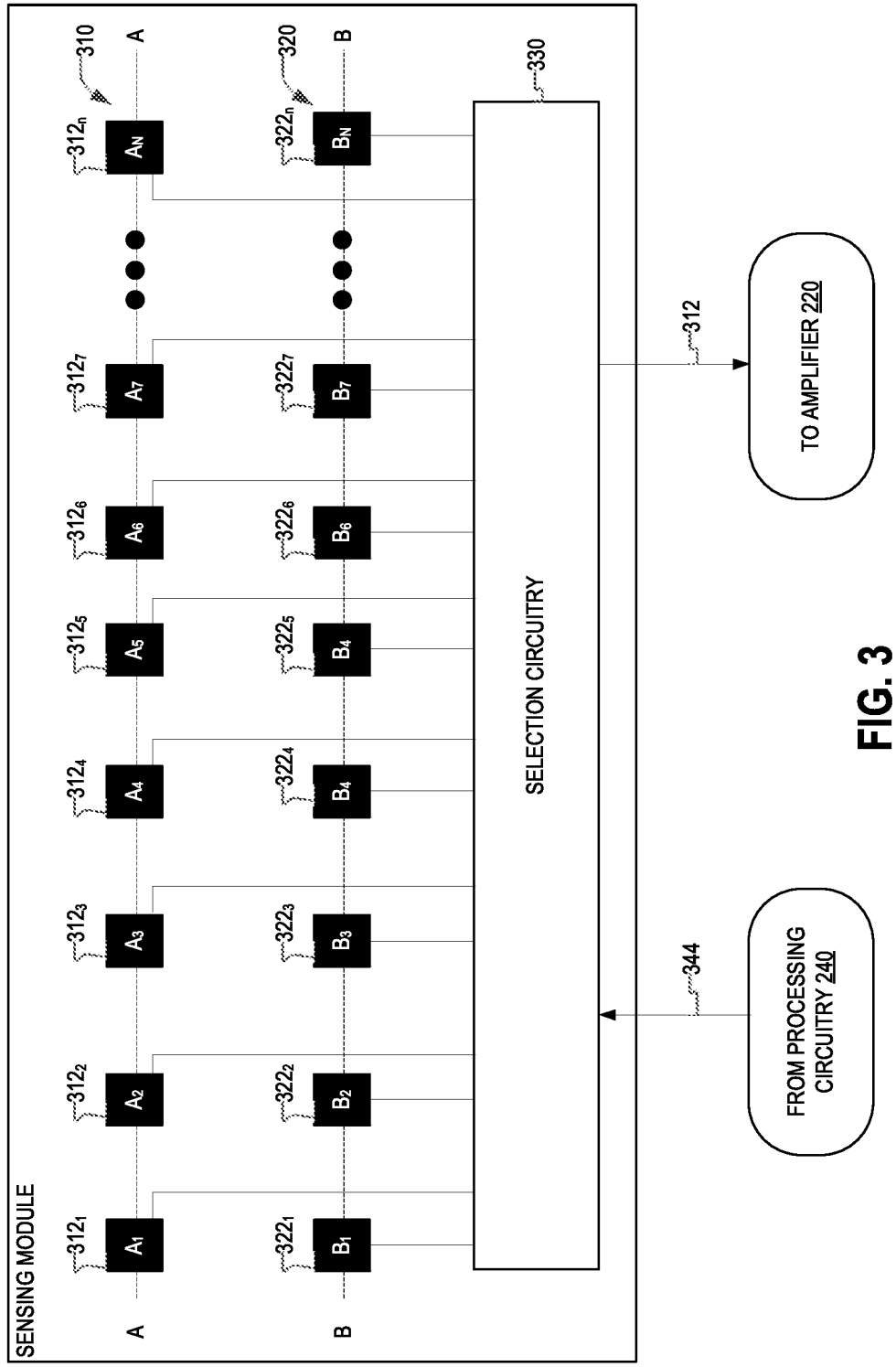
FIG. 3 is a diagram of an example of a sensing module that is part of the magnetic angle sensor, according to aspects of the disclosure.

FIG. 3 is a block diagram showing the sensor module 210 in further detail, according to aspects of the disclosure. According to the example of FIG. 3, the sensor module 210 may include a first sensor array 310, a second sensor array 320, and selection circuitry 330. The sensor array 310 may include a plurality of sensor elements 312, that are disposed along an axis A-A. The sensor array 320 may include a plurality of sensor elements 322 that are disposed along an axis B-B. According to the present example, each of the sensor elements 312 and 322 may include a Hall effect element that is arranged to measure the level of the z-axis component of the magnetic field H of the sensor 120. However, it will be understood that alternative implementations are possible in which another type of sensor element is used, such as a Vertical Hall sensor, a Giant magnetoresistance (GMR) sensor, a tunnel magnetoresistance (TMR) sensor, and/or any other suitable type of sensor.

The selection circuitry 330 may include one or more switching elements that are configured to selectively couple one, some or each of the sensor elements 312 and 322 to the amplifier 220 and/or processing circuitry 240. More specifically, the selection circuitry 330 may be configured to receive the selection signal 344 from the processing circuitry 240, which identifies one of the sensor elements 312 and 322. In response to the selection signal 344, the selection circuitry may electrically couple the identified sensor element to the amplifier 220, thereby enabling the processing circuitry 240 to obtain one or more sensor readings that are generated by the identified sensor element. Each of the sensor reading may identify the level of the z-axis component of the magnetic field H of the magnet 120. In operation, the processing circuitry may sample each of the sensors elements 312 and 322 in rapid succession, to obtain a set of sensor readings that are generated by the sensor elements 312 and 322, such that each of the sensor readings is generated by a different one of the sensor elements 312 and 314. As is further discussed below, the processing circuitry 240 may process the set of sensor readings to determine the orientation of the magnet 120 relative to the sensor 110.

According to the present example, the sensor module 210 is coupled to the processing circuitry 240 via a single channel, and the selection signal 244 is arranged to select only one of the sensor elements 312 and 322. However, it will be understood that alternative implementations are possible in which the sensor module 210 is coupled to the processing circuitry 240 via n channels, where n is an integer greater than 1. In such implementations, the selection signal 244 may be arranged to select n sensor elements, thereby allowing the processing circuitry to obtain n sensor readings in parallel.

Figure 4A:
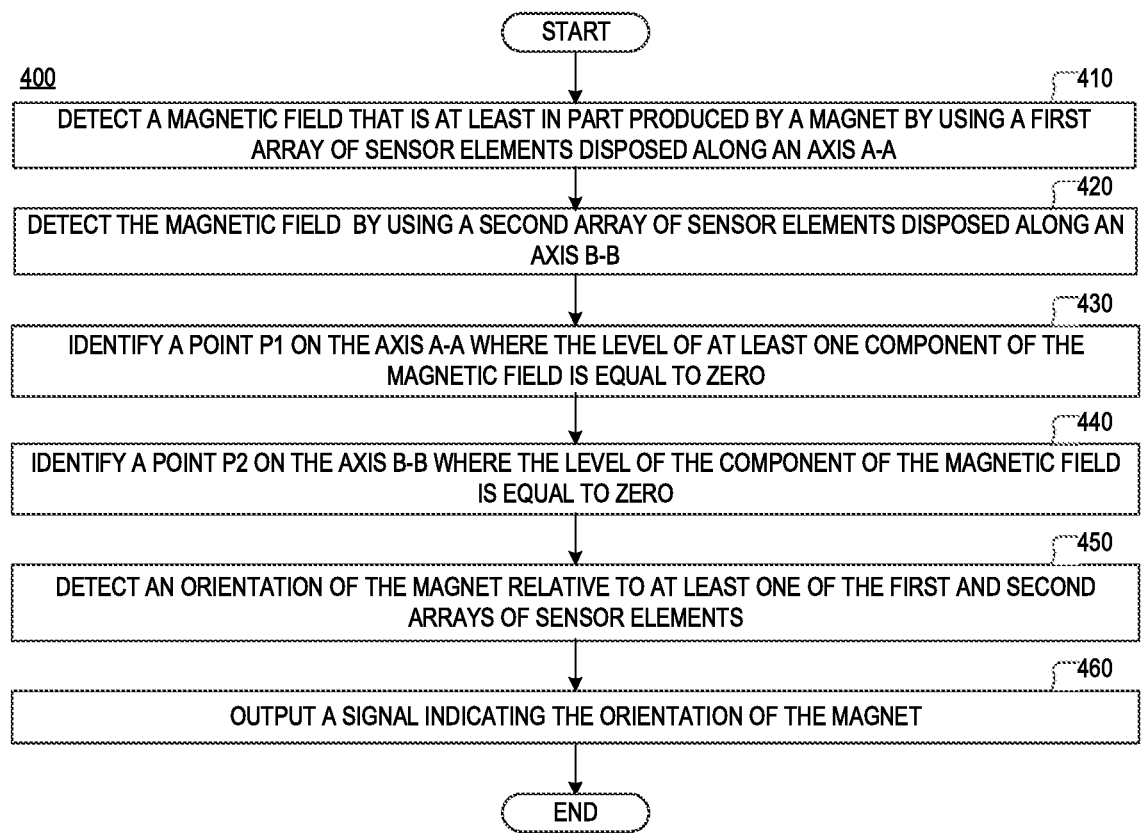
FIG. 4A is a flowchart of an example of a process that is performed by the sensor of FIG. 2, according to aspects of the disclosure.
Figure 4B:
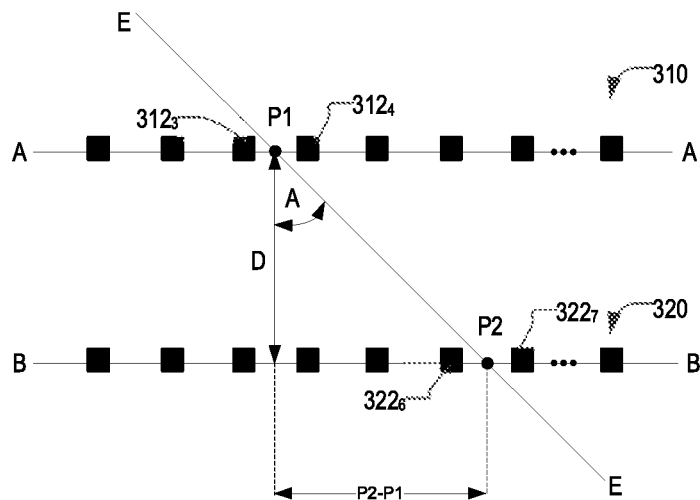
FIG. 4B is a schematic diagram illustrating the execution of the process of FIG. 4A, according to aspects of the disclosure

FIGS. 4A-B illustrate a process 400 for determining the orientation of the magnet 120 relative to the sensor 110. According to the present example, the process 400 is performed by the processing circuitry 240, which is part of the sensor 110. However, alternative implementations are possible in which process 400 is performed by processing circuitry that is external to the sensor 110. Stated succinctly, the present disclosure is not limited to any specific processing circuitry or processing method for implementing the process 400.

At processing block 410, processing begins by detecting the magnetic field H with the sensor array 310. In some implementations, detecting the magnetic field H may include obtaining a first plurality of sensor readings, wherein each of the sensor readings is obtained by a different one of the sensor elements 312 in the array 310. In some implementations, each of the sensor readings may identify the z-axis component of the magnetic field H at the location of the sensor element 312 that has generated the reading. As used throughout the disclosure, the term "sensor reading" is defined as any number, string, and/or an alphanumerical string that identifies a quantity that is measured by a respective sensor element.

In processing block 420, the magnetic field H is detected by using the sensor array 320. In some implementations, detecting the magnetic field H may include obtaining a second plurality of sensor readings, wherein each of the sensor readings is obtained by a different one of the sensor elements 322 in the sensor array 320.

In processing block 430, the processing circuitry 240 identifies a point on the axis A-A where at least one component of the magnetic field H is equal to zero. According to the present example, the processing circuitry 240 identifies a point P1, on the axis A-A, where the level of the z-axis component of the magnetic field H is estimated to be equal to zero (or another predetermined value). In some implementations, the point P1 may be identified in accordance with the process 500, which is discussed further below with respect to FIGS. 5A-B.

In processing block 440, the processing circuitry 240 identifies a point on the axis B-B where at least one component of the magnetic field H is equal to zero. According to the present example, the processing circuitry 240 identifies a point P2, on the axis B-B, where the level of the z-axis component of the magnetic field H is estimated to be equal to zero (or another predetermined value). In some implementations, the point P2 may be identified in accordance with the process 500, which is discussed further below with respect to FIGS. 5A-B.

In processing block 450, the processing circuitry 240 detects the orientation of the magnet 120 relative to the sensor 110. In some implementations, detecting the orientation of the magnet 120 may include identifying the orientation of a zero-field line E-E (that connects points P1 and P2), as illustrated in FIG. 4B, relative to at least one of the axes A-A and B-B. In some respects, in the presence of stray magnetic fields, the position of the zero-field line E-E may shift (relative to zero-field line E'-E' of the magnet 120, which is shown in FIGS. 1B-D), while remaining at the same angle relative to at least one of the axes A-A and B-B. However, when stray magnetic fields are not present, the zero-field line E-E may be substantially aligned with the zero-field line E'-E' of the magnet 120. Because the orientation of the zero-field line E-E is unaffected by stray magnetic fields, the zero-field line E-E may be used as a proxy for determining the orientation of the magnet 120 relative to the sensor 120. As can be readily appreciated, in some implementations, zero field lines E'-E' and E-E may remain substantially parallel to one another of all times, irrespective of whether stray magnetic fields are present.

According to the example of FIGS. 4A-B, to determine the orientation of the magnet 120 relative to the sensor 110, the processing circuitry 240 calculates an angle A between the zero-field line E-E and the axis A-A of the sensor array 310. In some implementations, the angle A may be determined by using Equation 1 below:

$$A = \operatorname{atan}\left(\frac{P2 - P1}{D}\right) \qquad \text{(Eq. 1)}$$

where P1 is the position of point P1 along axis A-A (e.g., distance from a reference point on axis A-A), P2 is the position of point P2 along axis B-B (e.g., distance from the reference point), and D is the distance between axis A-A and axis B-B.

In processing block 460, the processing circuitry 240 outputs a signal indicating the orientation of the magnet 120 relative to the sensor 110. According to the present example, the signal indicates (or is otherwise based on) the value of angle A. However, alternative implementations are possible in which the signal indicates (or is otherwise based on) the value of any angle between the axis E-E and one of the axes A-A and B-B. Furthermore, in some implementations, the signal may be an analog signal. Additionally or alternatively, in some implementations, the signal may be a digital signal. It will be understood that the present disclosure is not limited to any specific type of signal being output by the processing circuitry 240.

Figure 5A:
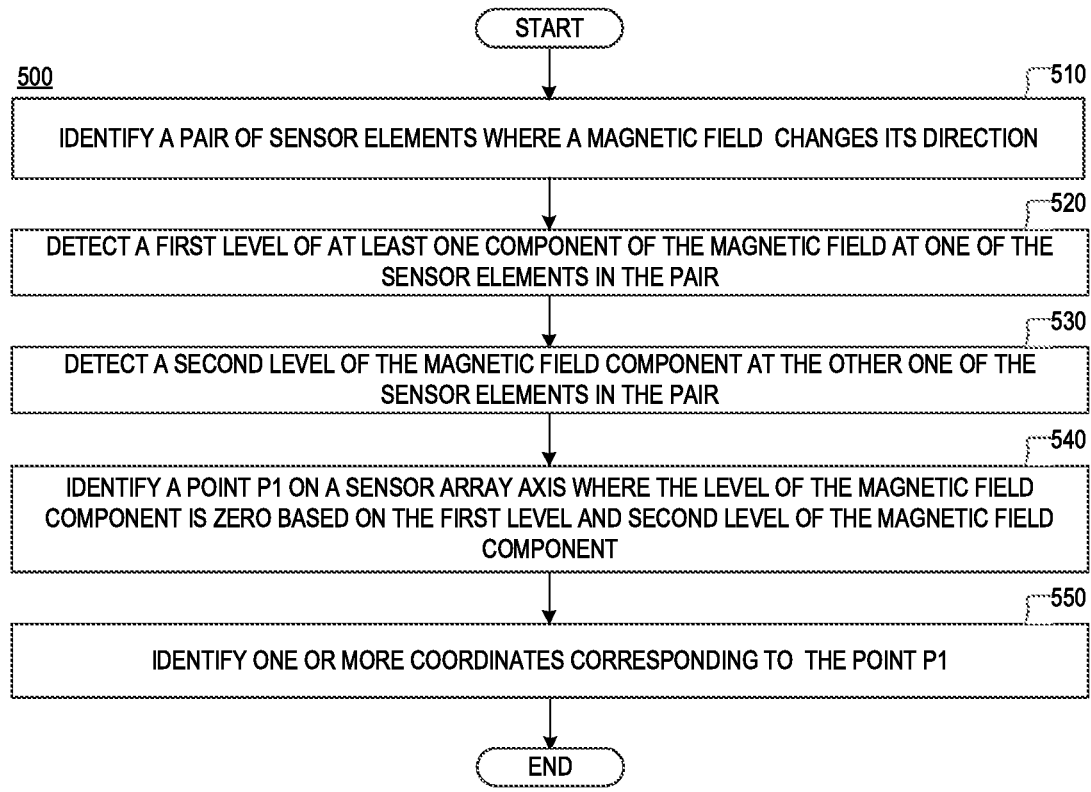
FIG. 5A is a flowchart of an example of another process that is performed by the sensor of FIG. 2, according to aspects of the disclosure.
Figure 5B:
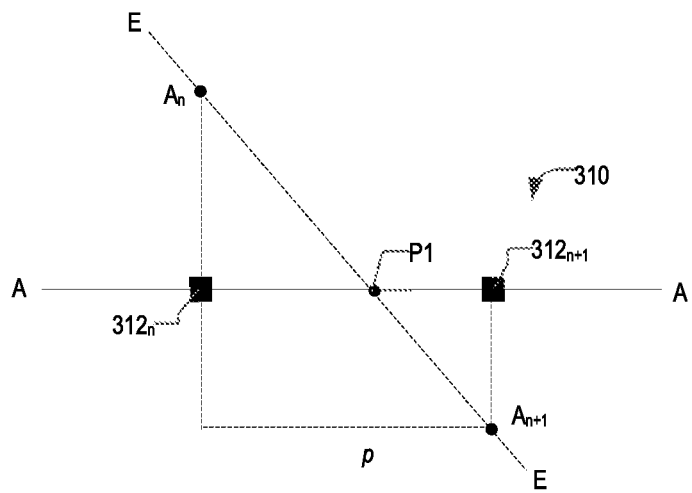
FIG. 5B is a schematic diagram illustrating the execution of the process of FIG. 4A, according to aspects of the disclosure

FIGS. 5A-B illustrate a process 500 for determining a point on the axis A-A of the sensor array 310, where the z-axis component of the magnetic field H is equal to zero.

Although the process 500 is described in the context of the sensor array 310, it will be understood that the process 500 may be used to determine a similar point on the axis B-B. In this regard, in some implementations, the process 500 may be used to determine the values of points P1 and P2, as discussed above with respect to processing blocks 430 and 440.

In processing block 510, a pair of sensor elements 312 are identified where the z-axis component magnetic field H changes direction. The pair may include a sensor element $312_n$, at which the z-axis component of the magnetic field H is positive and another sensor element $312_{n+1}$ at which the z-axis component of the magnetic field H is negative (e.g., as illustrated in FIG. 1E). According to the present example, n may be an integer that is greater than or equal to 1 and less than or equal to the count of sensors elements 312 in the sensor array 310. Although in the present example the pair includes adjacent sensor elements 312, alternative implementations are possible in which the sensor elements in the pair are non-adjacent. According to the present example, a pair of sensor elements in the same array are adjacent to one another when there are no other sensor elements from the array that are situated between them.

In processing block 520, the level (e.g., magnitude) of the magnetic field H is determined at the location of one of the sensor elements in the pair. According to the present example, the level (e.g., magnitude) $A_n$ of the z-axis component of the magnetic field H is determined at the location of sensor element $312_n$. As can be readily appreciated, the level of the magnetic field H may be determined based on a reading that is obtained from the sensor element $312_n$.

In processing block 530, the level of the magnetic field H is determined at the location of the other one of the sensor elements in the pair. According to the present example, the level $A_{n+1}$ of the z-axis component of the magnetic field H is determined at the location of sensor element $312_{n+1}$. As can be readily appreciated, the level of the magnetic field H may be determined based on a reading that is obtained from the sensor element $312_{n+1}$.

In processing block 540, a location on the axis A-A of the sensor array 310 is determined where the magnetic field H is expected to be zero. According to the present example, a location x is determined, on the axis A-A, where the z-axis component of the magnetic field H is expected to be equal to zero. In some implementations, the location x is determined by interpolating between the first sensor reading that is obtained from the sensor element $312_n$ with a second sensor reading that is obtained from the second sensor element $312_{n+1}$. In some implementations, the interpolation may be performed by using Equation 2 below:

$$x = p\left(\frac{B_n}{B_n - B_{n+1}}\right) \quad \text{(Eq. 2)}$$

where p is the distance between the sensor elements in the pair (e.g., pitch of the sensor element or a multiple of the pitch of the sensor elements, etc.).

In processing block 550, one or more coordinates of the point P are determined based on the location x. In some implementations, only an x-axis coordinate (e.g., in the coordinate system 126) may be determined for the point P. In such implementations, the x-axis coordinate of the point P may be determined by using Equation 3 below.

$$P = q + x \quad \text{(Eq. 3)}$$

where q is the distance (along the axis A-A) between the sensor element $312_1$ and the sensor element $312n$.

Figure 6A:
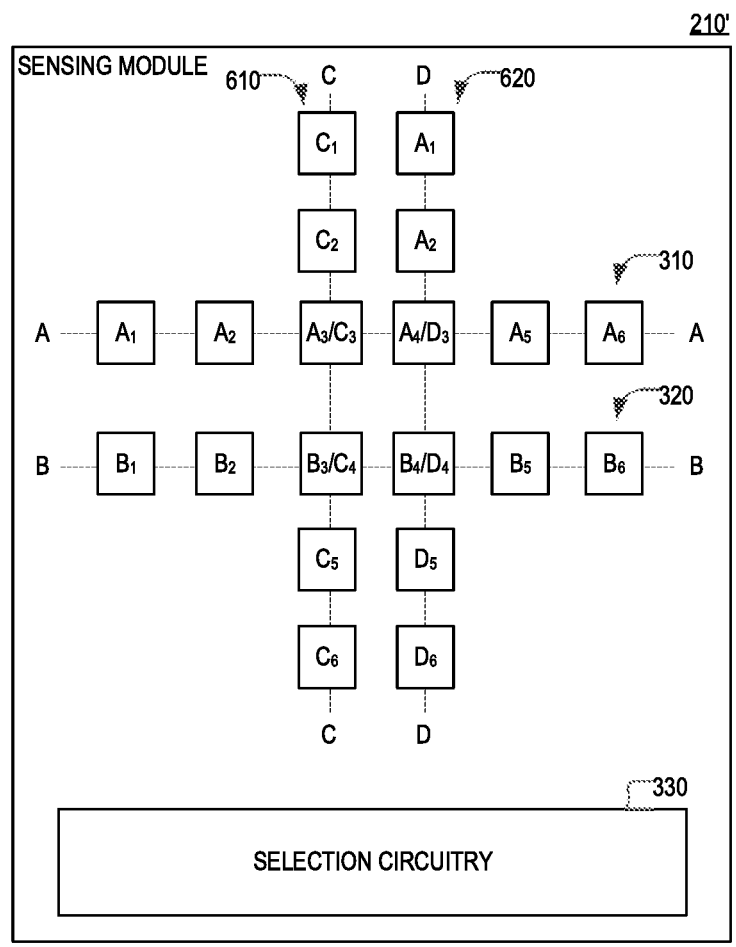
FIG. 6A is a diagram showing an alternative implementation of the sensing module of FIG. 3, according to aspects of the disclosure.

FIG. 6A is a diagram of the sensor module 210, in accordance with another implementation. Unlike the example discussed with respect to FIG. 3, in the example of FIG. 6A, the sensor module 210 may include a sensor array 610 and a sensor array 620, in addition to the sensor arrays 310 and 320. As illustrated, the sensor array 610 may include a plurality of sensor elements that are distributed along an axis C-C and the sensor array 620 may include a plurality of sensor elements that are distributed along an axis D-D. Each of the sensor elements in the sensor arrays 610 and/or 620 may be the same or similar to any of the sensor elements 312 or 322. As shown, the sensor array 610 may include one sensor element in common with the sensor array 310 and another sensor element in common with the sensor array 620. Similarly, the sensor array 610 may include one sensor element in common with the sensor array 310 and another sensor element in common with the sensor array 620. According to the present example, the axes C-C and D-D are parallel to one another and orthogonal to the axes A-A and B-B. However, it will be understood that alternative implementations are possible in which any of the axes C-C and D-D intersects at least one of the axes A-A and B-B at a different angle (e.g., a sharp angle or an obtuse angle).

Figure 6B:
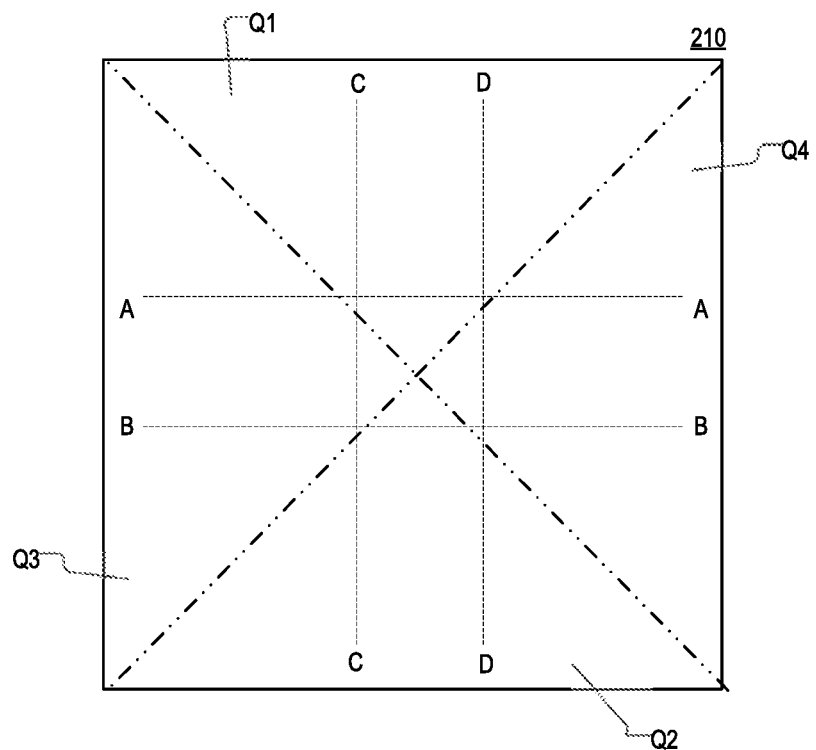
FIG. 6B is a diagram illustrating the division of the sensing module of FIG. 6A into quadrants, according to aspects of the disclosure.

FIG. 6B is a schematic diagram illustrating the division of the sensor module 210 into quadrants, Q1, Q2, Q3, and Q4. In some implementations, when the sensor module 210 includes only the sensor arrays 310 and 320 (e.g., see FIG. 3), the sensor module 210 may be able to reliably measure the orientation of the magnet 120 only when the axis C-C of the magnet 120 overlaps with quadrants Q1 and Q2. In this regard, the addition of the sensor arrays 610 and 620 to the sensor module 210 (e.g., see FIG. 6B) enables the sensor module 210 to detect the orientation of the magnet 120 when the zero-field line E-E overlaps with quadrants Q3 and Q4. In other words, the addition of the sensor arrays 610 and 620 affords the sensor module 210 a complete 360-degree coverage.

In some implementations, when the sensor module 210 includes only the sensor arrays 310 and 320 (e.g., see FIG. 3), the sensor module 210 may be unable to reliably measure the orientation of the magnet 120 when the zero-field line E-E of the magnet 120 overlaps with quadrants Q3 and Q4 for at least several reasons. For instance, when the zero-field line E-E is parallel with any of the axes A-A and B-B, Equation 2 may not have a solution. Furthermore, because the length of the sensor arrays 310 and 320 is limited, the zero-field line E-E may not intersect the sensor arrays 310 and 320 when it is situated at a comparatively sharp angle relative to the axes A-A and B-B.

Figure 7:
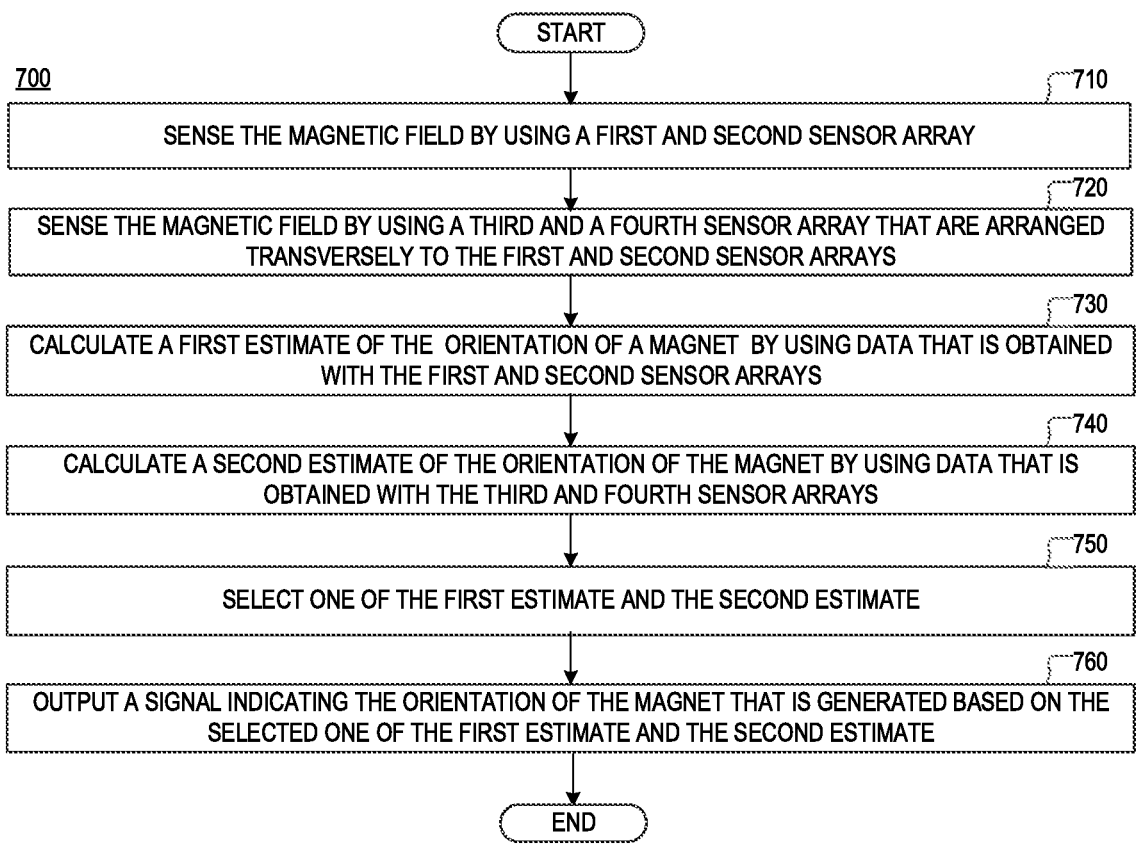
FIG. 7 is a flowchart of an example of yet another process that is performed by the sensor of FIG. 2, according to aspects of the disclosure.

FIG. 7 is a flowchart of an example of a process 700 for using the sensor module 210' that is shown in FIG. 6A. According to the present example, the process 700, may, for example, be performed by the processing circuitry 240, which is part of the sensor 110. However, alternative implementations are possible in which the process 700 is performed by processing circuitry that is external to the sensor 110. Stated succinctly, the present disclosure is not limited to any specific method for implementing the process 700.

In processing block 710, the processing circuitry 240 senses the magnetic field H by using the sensor arrays 310 and 320. In some implementations, sensing the magnetic field H may include obtaining a plurality of readings from the sensor arrays 310 and 320, wherein each of the readings in the plurality is generated by a different one of the sensor elements in the sensor arrays 310 and 320.

In processing block 720, the processing circuitry 240 senses the magnetic field H by using the sensor arrays 610 and 620. In some implementations, sensing the magnetic field H may include obtaining a plurality of readings from the sensor arrays 610 and 620, wherein each of the readings in the plurality is generated by a different one of the sensor elements in the sensor arrays 610 and 620.

In processing block 730, the processing circuitry 240 calculates a first estimate of the orientation of the magnet 120 relative to the sensor 110. The first estimate may include any suitable type of number, string, or alphanumerical string. The first estimate may be calculated based on any of the data that is obtained at processing block 710, as discussed with respect to processing blocks 430-450 of the process 400. In some implementations, the first estimate may have one of at least two possible values: (i) a value that indicates an angle between the zero-field line E-E of the magnet 120 and at least one of the axes A-A and B-B of the sensor arrays 310 and 320, and (ii) a second value that indicates that first estimate is invalid. In some implementations, the second value may be assigned to the first estimate when Equation 1 has no solution or when the solution of Equation 1 is out of predetermined bounds. As noted above, in some implementations, Equation 1 may lack a solution when the zero-field line E-E of the magnet 120 is parallel with the axes A-A and B-B of the sensor arrays 120. Similarly, in instances in which it is impossible to identify a pair of sensing elements at which the magnetic field H changes sign, Equation 1 may also be said to lack a solution.

In processing block 740, the processing circuitry 240 calculates a second estimate of the orientation of the magnet 120 relative to the sensor 110. The second estimate may include any suitable type of number, string, or alphanumerical string. The second estimate may be calculated based on any of the data that is obtained at processing block 720, as discussed with respect to processing blocks 430-450 of the process 400. In some implementations, the first estimate may have one of at least two possible values: (i) a value that indicates an angle between the zero-field line E-E of the magnet 120 and at least one of the axes C-C and D-D of the sensor arrays 310 and 320, and (ii) a second value that indicates that second estimate is invalid. In some implementations, the second value may be assigned to the second estimate when Equation 1 has no solution or when the solution of Equation 1 is out of predetermined bounds. As noted above, in some implementations, Equation 1 may lack a solution when the zero-field line E-E of the magnet 120 is parallel with the axes C-C and D-D of the sensor arrays 610 and 620, respectively. Similarly, in instances in which it is impossible to identify a pair of sensing elements at which the magnetic field H changes sign, Equation 1 may also be said to lack a solution.

In processing block 750, the processing circuitry 240 selects one of the first estimate and the second estimate. In some implementations, when the second estimate is invalid, the processing circuitry 240 may select the first estimate. Additionally or alternatively, in some implementations, when the first estimate is invalid, the processing circuitry 240 may select the second estimate. Additionally or alternatively, in some implementations, the sensor arrays 310, 320, 610, and 620 may be arranged such that only one of the first estimate and the second estimate is valid.

In processing block 760, the processing circuitry 240 outputs a signal indicating the orientation of the magnet 120. In some implementations, the signal may be generated based on the estimate selected at processing block 750. As noted above, the signal may be either an analog signal or a digital signal.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term product may include a physical object that is being bought and sold, a service, and/or anything else that can be purchased and solved.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Although in the example of FIGS. 1A-7 the magnet 120 has a cylindrical shape, it will be understood that the present disclosure is not limited to the magnet 120 having any specific shape. In this regard, alternative implementations are possible in which the magnet is shaped as a parallelepiped, a truncated pyramid, etc. Although in the example of FIG. 3 axes A-A and B-B are parallel to one another, alternative implementations are possible in which the axes A-A and B-B are not parallel. Although in the example of FIG. 3, the pitch of the sensor elements 312 in the sensor array 310 is uniform, alternative implementations are possible in which the pitch of the sensor elements 312 in the sensor array 310 is not uniform. Similarly, although in the example of FIG. 3, the pitch of the sensor elements 322 in the sensor array 320 is uniform, alternative implementations are possible in which the pitch of the sensor elements 322 in the sensor array 320 is not uniform.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the processing blocks of the exemplary methods set forth herein are not necessarily required to be performed in the order described, and the order of the processing blocks of such methods should be understood to be merely exemplary. Likewise, additional processing blocks may be included in such methods, and certain processing blocks may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A sensor for detecting an orientation of a magnet, the sensor comprising:
a first sensor array including a first plurality of sensor elements that are arranged along a first line, the first sensor array including at least three sensor elements;
a second sensor array including a second plurality of sensor elements that are arranged along a second line, the second sensor array including at least three sensor elements; and
a processing circuitry configured to:
identify a first pair of sensor elements in the first sensor array, the first pair including a sensor element at which a component of a magnetic field is positive and a sensor element at which the component of the magnetic field is negative;
identify a first point on the first line where the component of the magnetic field has a predetermined value based on respective readings that are taken using the sensor elements in the first pair;
identify a second pair of sensor elements in the second sensor array, the second pair including a sensor element at which the component of the magnetic field is positive and a sensor element at which the component of the magnetic field is negative;
identify a second point on the second line where the component of the magnetic field has the predetermined value based on respective readings that are taken using the sensor elements in the second pair;
detect the orientation of the magnet relative to the sensor based on the first point and the second point; and
output an indication of the orientation of the magnet based on the first point and the second point.

2. The sensor of claim 1, wherein the orientation of the magnet is detected further based on a distance between the first sensor array and the second sensor array.

3. The sensor of claim 1, wherein:
the component of the magnetic field includes a z-axis component of the magnetic field;
the first point includes a location on the first line where the z-axis component of the magnetic field is estimated to be equal to zero, and
the second point includes a location on the second line where the z-axis component of the magnetic field is estimated to be equal to zero.

4. The sensor of claim 1, wherein:
detecting the orientation of the magnet includes detecting an angle between a zero-crossing line and one of the first line and the second line, and
the zero-crossing line extends between the first point and the second point.

5. The sensor of claim 1, wherein either the first plurality of sensor elements or the second plurality of sensor elements comprises a Hall effect element.

6. The sensor of claim 1, wherein the component of the magnetic field includes a z-axis component of the magnetic field.

7. The sensor of claim 1, wherein the first sensor array has a non-uniform pitch, and the second sensor array has a non-uniform pitch.

8. The sensor of claim 1, wherein the sensors in the first pair are adjacent to one another, and the sensors in the second pair are adjacent to one another.

9. A sensor for detecting an orientation of a magnet, the sensor comprising:
- a first sensor array including a first plurality of sensor elements that are arranged along a first line;
- a second sensor array including a second plurality of sensor elements that are arranged along a second line;
- a third sensor array including a third plurality of sensor elements that are arranged along a third line, the third line being transverse to the first line and the second line; and
- a fourth sensor array including a fourth plurality of sensor elements that are arranged along a fourth line, the fourth line being transverse to the first line and the second line,
- a processing circuitry configured to: detect the orientation of the magnet by using the first sensor array, the second sensor array, the third sensor array and the fourth sensor array; and output an indication of the orientation of the magnet.

10. A sensor for detecting an orientation of a magnet, the sensor comprising:
- a first sensor array including a first plurality of sensor elements that are arranged along a first line, the first plurality of sensor elements including at least three sensor elements;
- a second sensor array including a second plurality of sensor elements that are arranged along a second line, the second plurality of sensor elements including at least three sensor elements; and
- a processing circuitry configured to:
- identify a first pair of sensor elements in the first sensor array where a magnetic field produced by the magnet changes sign;
- identify a first point on the first line where at least one component of the magnetic field has a predetermined value, the first point being identified based on respective readings that are taken using the sensor elements in the first pair;
- identify a second pair of sensor elements in the second sensor array where the magnetic field produced by the sensor changes sign;
- identify a second point on the second line where the at least one component of the magnetic field has a predetermined value, the second point being identified based on respective readings that are taken using the sensor elements in the second pair;
- detect the orientation of the magnet relative to the sensor based on the first point, the second point, and a distance between the first sensor array and the second sensor array; and
- output an indication of the orientation of the magnet.

11. The sensor of claim 10, wherein detecting the magnetic field with the first sensor array includes detecting only a z-axis component of the magnetic field and detecting the magnetic field with the second sensor array includes detecting only the z-axis component of the magnetic field, the z-axis component of the magnetic field being transverse to a plane of the magnet.

12. The sensor of claim 10, wherein the sensor elements in the first pair are adjacent to one another, and the sensor elements in the second pair are adjacent to one another.

13. The sensor of claim 10, wherein the first line is a straight line, and the second line is a straight line.

14. The sensor of claim 10, wherein either the first plurality of sensor elements or the second plurality of sensor elements includes a Hall effect element.

15. A method for detecting an orientation of a magnet relative to a sensor, the sensor including a first sensor array having at least three sensor elements that are arranged along a first line and a second sensor array having at least three sensor elements that are arranged along a second line, the method comprising:
- identifying a first pair of sensor elements in the first sensor array where a magnetic field produced by the magnet changes sign;
- identifying a first point on the first line where at least one component of the magnetic field has a predetermined value based on respective readings that are taken using the sensor elements in the first pair;
- identifying a second pair of sensor elements in the second sensor array where the magnetic field produced by the magnet changes sign;
- identifying a second point on the second line where the at least one component of the magnetic field has the predetermined value based on respective readings that are taken using the sensor elements in the second pair;
- detecting the orientation of the magnet relative to the sensor based on the first point and the second point; and
- outputting an indication of the orientation of the magnet based on the first point and the second point.

16. The method of claim 15, wherein:
- the first point includes a location on the first line where a z-axis component of the magnetic field is estimated to be equal to zero, and
- the second point includes a location on the second line where the z-axis component of the magnetic field is estimated to be equal to zero.

17. The method of claim 15, wherein the first line is a straight line, and the second line is a straight line.

18. The method of claim 16, wherein the first sensor array has a non-uniform pitch and the second sensor array has a non-uniform pitch.

* * * * *